United States Patent
Isaka et al.

(10) Patent No.: US 8,203,733 B2
(45) Date of Patent: Jun. 19, 2012

(54) IMAGE PROCESSING APPARATUS, STORAGE MEDIUM IN WHICH IMAGE PROCESSING PROGRAM IS STORED, AND IMAGE PROCESSING METHOD

(75) Inventors: Youichi Isaka, Kanagawa (JP); Yukio Kumazawa, Kanagawa (JP); Takashi Nagao, Kanagawa (JP); Takashi Igarashi, Tokyo (JP); Yusuke Sugimoto, Tokyo (JP); Kazuyuki Itagaki, Tokyo (JP); Junichi Kaneko, Kanagawa (JP)

(73) Assignees: Fuji Xerox Co., Ltd., Tokyo (JP); Fujifilm Corporation, Tokyo (JP)

( * ) Notice: Subject to any disclaimer, the term of this patent is extended or adjusted under 35 U.S.C. 154(b) by 1447 days.

(21) Appl. No.: 11/797,477

(22) Filed: May 3, 2007

(65) Prior Publication Data

US 2008/0013862 A1    Jan. 17, 2008

(30) Foreign Application Priority Data

Jul. 14, 2006   (JP) .................................. 2006-194416

(51) Int. Cl.
    *G06F 3/12* (2006.01)
(52) U.S. Cl. ...... 358/1.15; 358/2.1; 358/1.16; 358/1.17; 711/147; 711/170
(58) Field of Classification Search .......... 358/1.1–3.23; 710/1–74
    See application file for complete search history.

(56) References Cited

U.S. PATENT DOCUMENTS

| | | |
|---|---|---|
| 4,741,047 A | 4/1988 | Sharpe, II |
| 4,918,541 A | 4/1990 | Ishida et al. |
| 5,289,577 A | 2/1994 | Gonzales et al. |
| 5,450,599 A | 9/1995 | Horvath et al. |
| 5,594,854 A | 1/1997 | Baldwin et al. |
| 5,627,995 A | 5/1997 | Miller et al. |
| 5,692,210 A | 11/1997 | Mita et al. |
| 5,757,965 A | 5/1998 | Ohki |
| 6,002,411 A | 12/1999 | Dye |
| 6,028,611 A | 2/2000 | Anderson et al. |

(Continued)

FOREIGN PATENT DOCUMENTS

JP    A-05-260373    10/1993

(Continued)

OTHER PUBLICATIONS

Notice of Reasons for Rejection issued in corresponding Japanese Patent Application No. 2006-194416 on Jul. 12, 2011. (with English language translation).

(Continued)

*Primary Examiner* — Benny Q Tieu
*Assistant Examiner* — Marcellus Augustin
(74) *Attorney, Agent, or Firm* — Oliff & Berridge, PLC

(57) ABSTRACT

An image processing apparatus according to an aspect of the invention includes a first storage unit, a second storage unit, a control unit, and a construction unit. A program of at least one module including a buffer module among modules of an image processing unit is stored in the first storage unit. An image processing program and a shared library can be additionally stored in the second storage unit. The image processing program is used to perform image processing and a program of a module generation unit is registered in the shared library. The control unit instructs at least one module in the image processing unit to perform image processing during construction of the image processing unit. The construction unit constructs the image processing unit.

13 Claims, 13 Drawing Sheets

U.S. PATENT DOCUMENTS

| | | | |
|---|---|---|---|
| 6,092,171 | A | 7/2000 | Relph |
| 6,446,145 | B1 | 9/2002 | Har et al. |
| 6,473,527 | B1 | 10/2002 | Wang |
| 6,490,669 | B1 | 12/2002 | Yabe |
| 6,502,097 | B1 | 12/2002 | Chan et al. |
| 6,557,083 | B1 | 4/2003 | Sperber et al. |
| 6,577,254 | B2 | 6/2003 | Rasmussen |
| 6,581,102 | B1 | 6/2003 | Amini et al. |
| 6,867,782 | B2 | 3/2005 | Gaudette et al. |
| 6,883,079 | B1 | 4/2005 | Priborsky |
| 6,924,821 | B2 | 8/2005 | Trinh et al. |
| 6,944,720 | B2 | 9/2005 | Sperber et al. |
| 6,970,265 | B2 | 11/2005 | Ho |
| 6,978,054 | B2 | 12/2005 | Chiba et al. |
| 7,024,512 | B1 | 4/2006 | Franaszek et al. |
| 7,058,783 | B2 | 6/2006 | Chandrasekaran et al. |
| 7,111,142 | B2 | 9/2006 | Spencer et al. |
| 7,366,239 | B1 | 4/2008 | Leventer et al. |
| 7,386,046 | B2 | 6/2008 | Fallon et al. |
| 7,565,287 | B2 | 7/2009 | Sadri et al. |
| 7,595,803 | B2 | 9/2009 | Seki et al. |
| 7,598,957 | B2 | 10/2009 | Isaka et al. |
| 7,602,391 | B2 | 10/2009 | Nagao et al. |
| 7,602,392 | B2 | 10/2009 | Nagao et al. |
| 7,602,393 | B2 | 10/2009 | Kumazawa et al. |
| 7,602,394 | B2 | 10/2009 | Seki et al. |
| 7,605,818 | B2 | 10/2009 | Nagao et al. |
| 7,605,819 | B2 | 10/2009 | Kumazawa et al. |
| 7,652,671 | B2 | 1/2010 | Nagao et al. |
| 2002/0026631 | A1* | 2/2002 | Barritz ............ 717/127 |
| 2002/0036801 | A1 | 3/2002 | Ho |
| 2002/0059314 | A1 | 5/2002 | Yoneyama |
| 2002/0124142 | A1 | 9/2002 | Har et al. |
| 2002/0145610 | A1 | 10/2002 | Barilovits et al. |
| 2003/0001851 | A1 | 1/2003 | Bushey |
| 2003/0169262 | A1 | 9/2003 | Lavelle et al. |
| 2003/0179927 | A1* | 9/2003 | Nagao ............ 382/173 |
| 2003/0191903 | A1 | 10/2003 | Sperber et al. |
| 2004/0027609 | A1* | 2/2004 | Isaka et al. .......... 358/1.15 |
| 2004/0054847 | A1 | 3/2004 | Spencer et al. |
| 2004/0098545 | A1 | 5/2004 | Pline et al. |
| 2004/0130552 | A1 | 7/2004 | Duluk et al. |
| 2004/0199740 | A1 | 10/2004 | Makela et al. |
| 2005/0015514 | A1 | 1/2005 | Garakani et al. |
| 2005/0125676 | A1 | 6/2005 | Fujiwara et al. |
| 2005/0140787 | A1 | 6/2005 | Kaplinsky |
| 2005/0179695 | A1 | 8/2005 | Saito et al. |
| 2006/0165109 | A1 | 7/2006 | Kitamura et al. |
| 2006/0274971 | A1* | 12/2006 | Kumazawa et al. .......... 382/276 |
| 2007/0016724 | A1 | 1/2007 | Gaither et al. |
| 2007/0247466 | A1 | 10/2007 | Kumazawa et al. |
| 2007/0248288 | A1 | 10/2007 | Nagao et al. |
| 2008/0022292 | A1 | 1/2008 | Gibson |

FOREIGN PATENT DOCUMENTS

| | | |
|---|---|---|
| JP | A-5-260373 | 10/1993 |
| JP | A-06-236259 | 8/1994 |
| JP | A-06-250828 | 9/1994 |
| JP | A-7-105020 | 4/1995 |
| JP | A-8-272981 | 10/1996 |
| JP | A-9-116660 | 5/1997 |
| JP | A-2001-43080 | 2/2001 |
| JP | A-2002-32221 | 1/2002 |
| JP | A-2002-259257 | 9/2002 |
| JP | A-2002-536767 | 10/2002 |
| JP | A-2004-287883 | 10/2004 |
| JP | A-2005-92737 | 4/2005 |
| JP | A-2005-335305 | 12/2005 |
| WO | WO 00/48099 | 8/2000 |
| WO | WO 2005/121920 | 12/2005 |

OTHER PUBLICATIONS

Dec. 14, 2009 Office Action issued in U.S. Appl. No. 11/707,025.
Office Action issued in U.S. Appl. No. 11/291,924 on Sep. 4, 2008.
Office Action issued in U.S. Appl. No. 11/291,924 on Feb. 18, 2009.
Notice of Allowance issued in U.S. Appl. No. 11/291,924 on Jul. 24, 2009.
Office Action issued in U.S. Appl. No. 11/291,915 on Sep. 5, 2008.
Office Action issued in U.S. Appl. No. 11/291,915 on Feb. 23, 2009.
Notice of Allowance issued in U.S. Appl. No. 11/291,915 on Jul. 24, 2009.
Office Action issued in U.S. Appl. No. 11/291,916 on Sep. 4, 2008.
Office Action issued in U.S. Appl. No. 11/291,916 on Feb. 23, 2009.
Notice of Allowance issued in U.S. Appl. No. 11/291,916 on Jul. 30, 2009.
Office Action issued in U.S. Appl. No. 11/291,908 on Sep. 4, 2008.
Office Action issued in U.S. Appl. No. 11/291,908 on Feb. 23, 2009.
Notice of Allowance issued in U.S. Appl. No. 11/291,908 on Jul. 27, 2009.
Office Action issued in U.S. Appl. No. 11/291,902 on Aug. 19, 2008.
Office Action issued in U.S. Appl. No. 11/291,902 on Feb. 23, 2009.
Notice of Allowance issued in U.S. Appl. No. 11/291,902 on Jul. 24, 2009.
Office Action issued in U.S. Appl. No. 11/291,824 on Sep. 12, 2008.
Office Action issued in U.S. Appl. No. 11/291,824 on Feb. 23, 2009.
Notice of Allowance issued in U.S. Appl. No. 11/291,824 on Jul. 28, 2009.
Office Action issued in U.S. Appl. No. 11/291,825 on Sep. 3, 2008.
Office Action issued in U.S. Appl. No. 11/291,825 on Feb. 17, 2009.
Notice of Allowance issued in U.S. Appl. No. 11/291,825 on Jul. 24, 2009.
Notice of Allowance issued in U.S. Appl. No. 11/637,721 on Nov. 3, 2009.
Office Action issued in U.S. Appl. No. 11/291,823 on Aug. 18, 2008.
Office Action issued in U.S. Appl. No. 11/291,823 on Feb. 13, 2009.
Notice of Allowance issued in U.S. Appl. No. 11/291,823 on Jul. 24, 2009.
Office Action issued in U.S. Appl. No. 11/707,025 on Jun. 16, 2010.

* cited by examiner

CONFIGURATION EXAMPLE OF IMAGE PROCESSING UNIT

SCHEMATIC CONFIGURATION AND PROCESSING OF IMAGE PROCESSING MODULE

SCHEMATIC CONFIGURATION AND PROCESSING OF BUFFER MODULE
(IN THE CASE WHERE IMAGE DATA REQUESTED FROM THE
FOLLOWING MODULE IS NO STORED IN BUFFER)

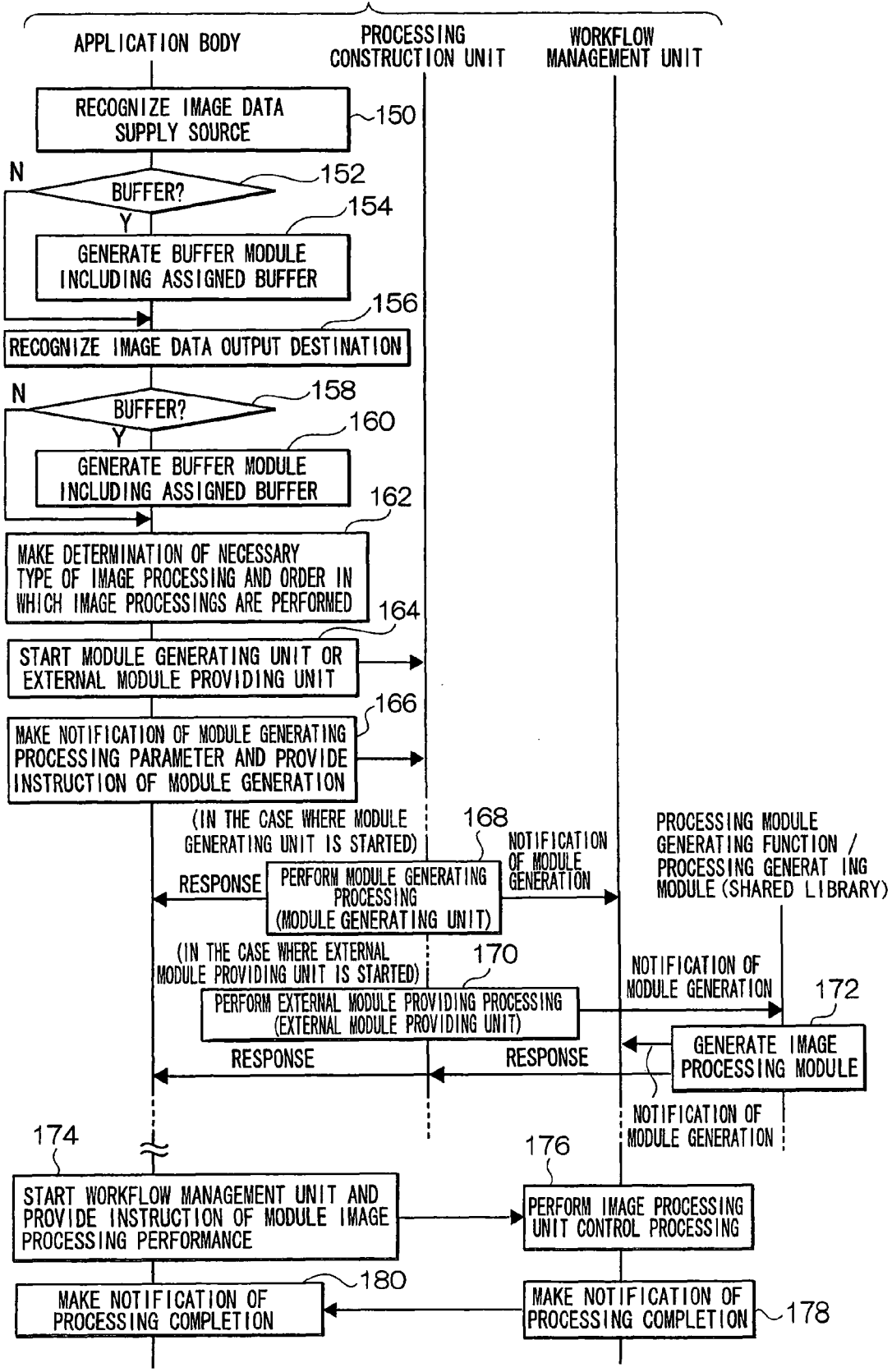

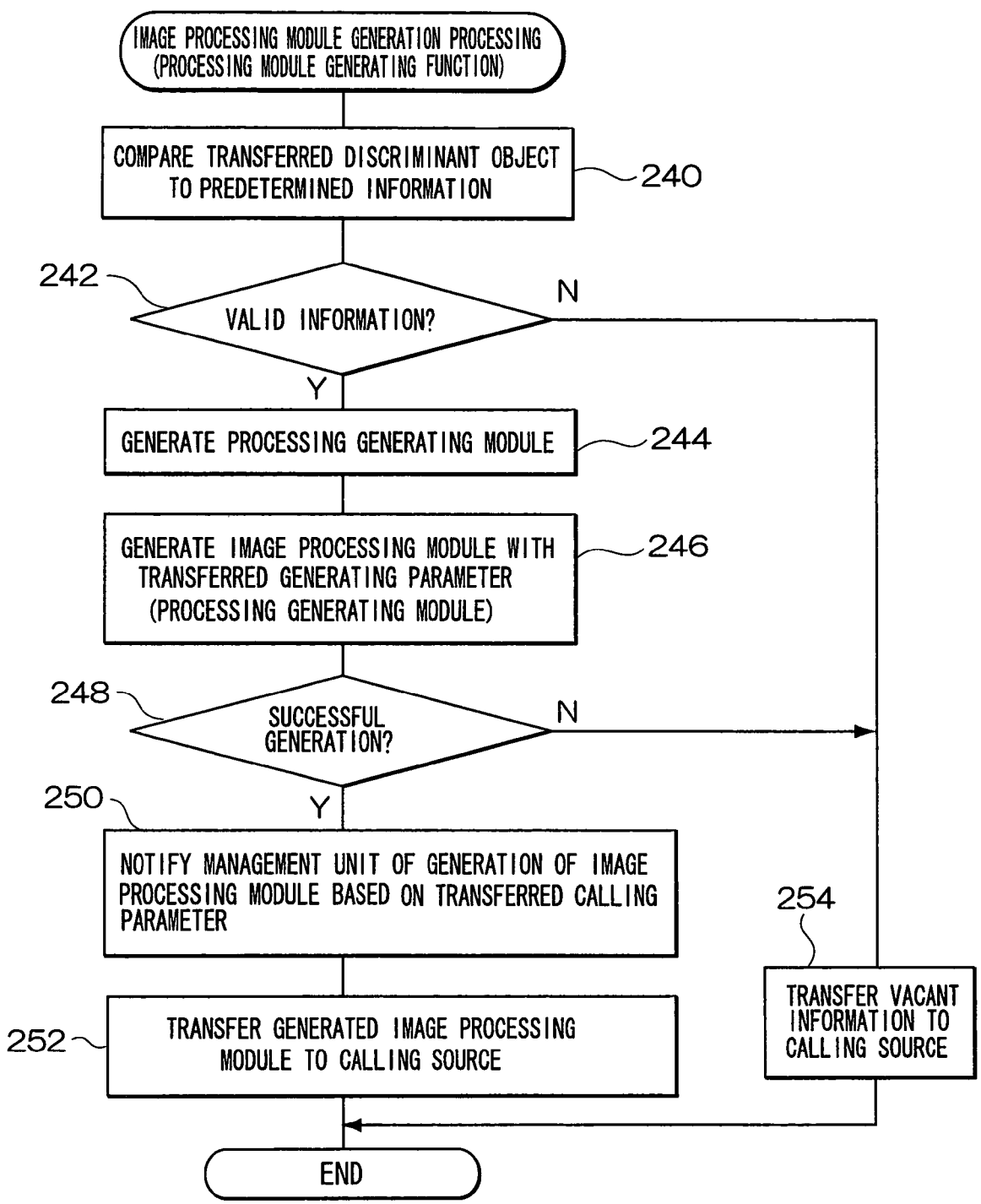

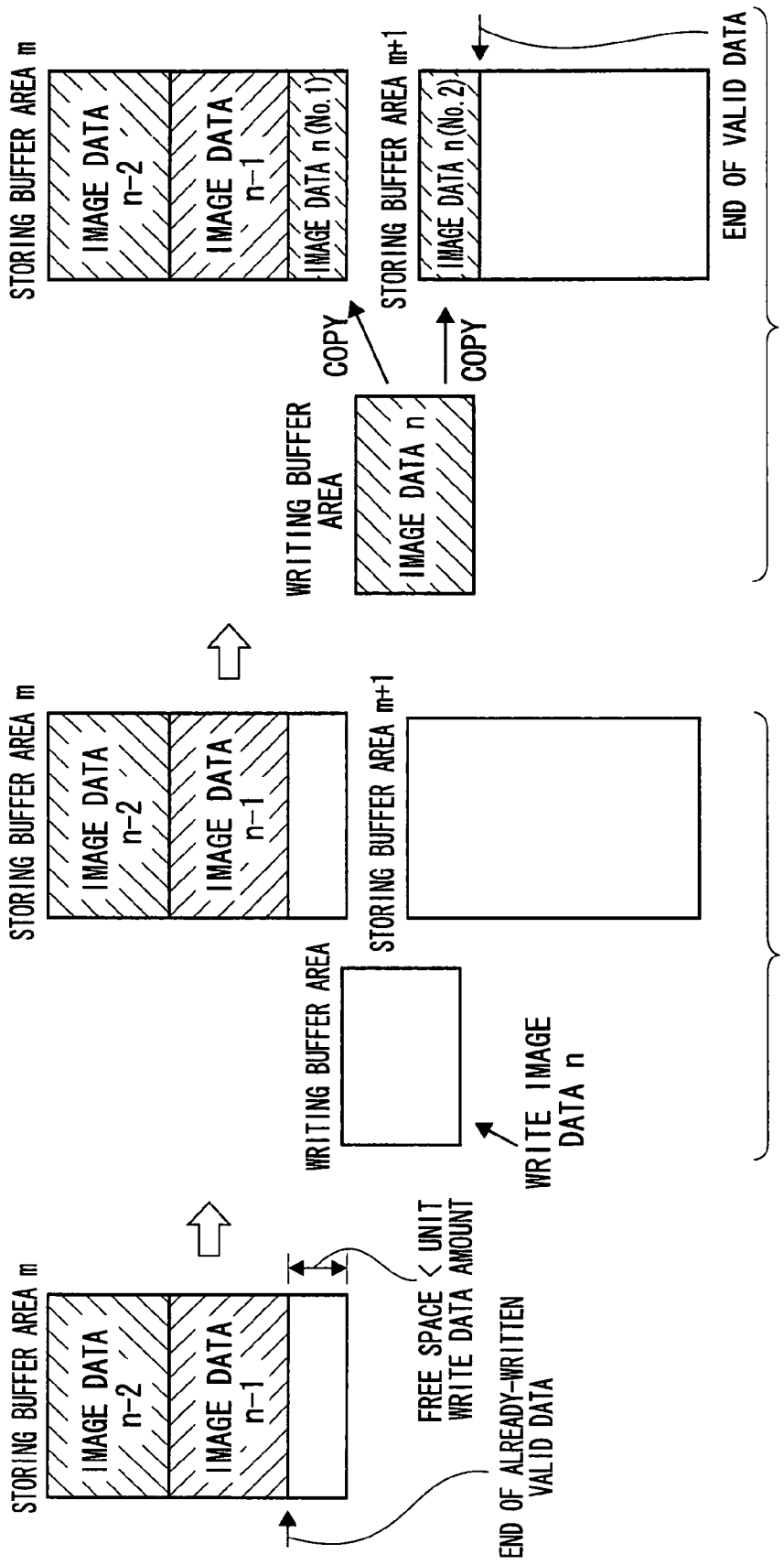

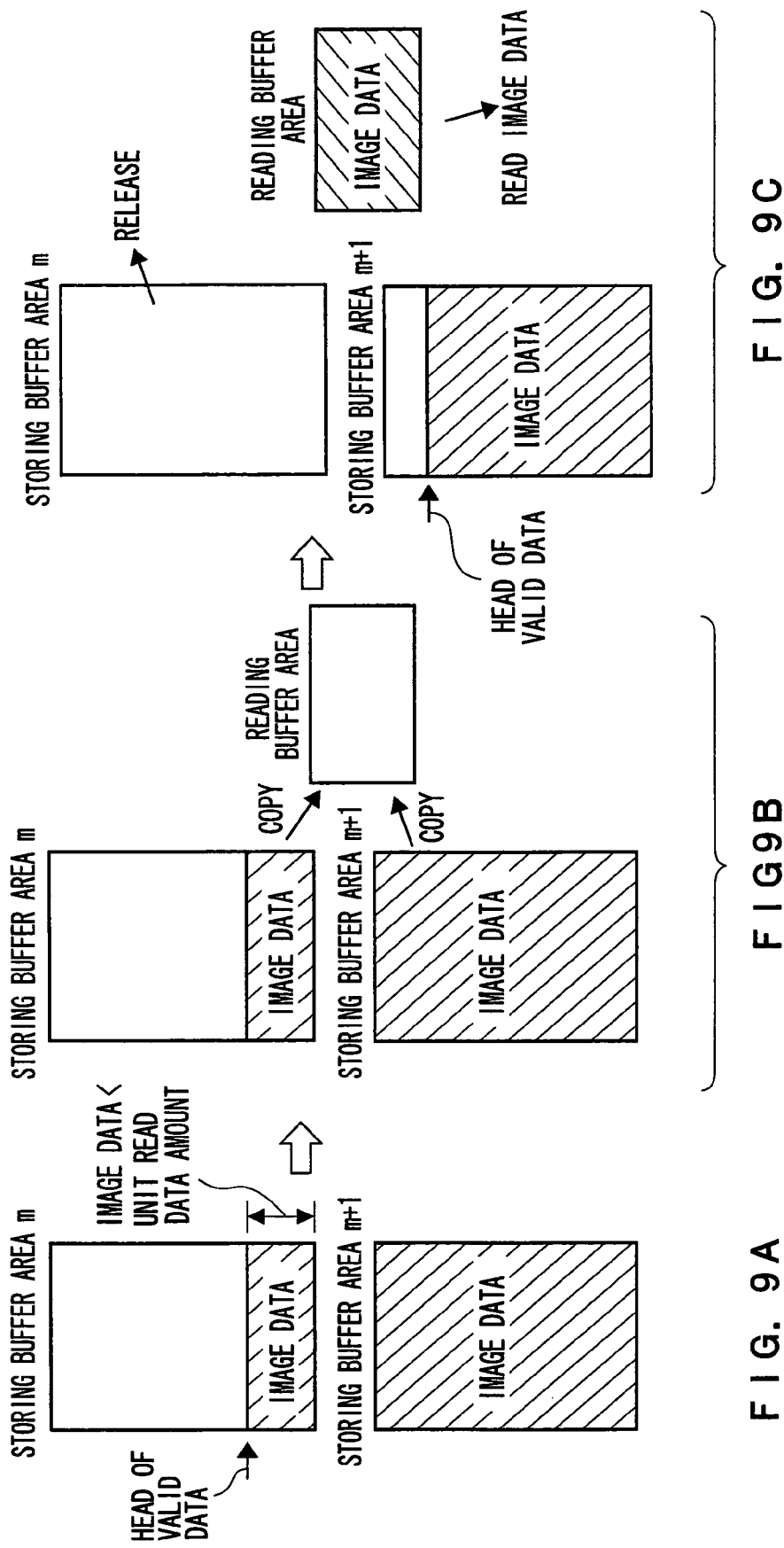

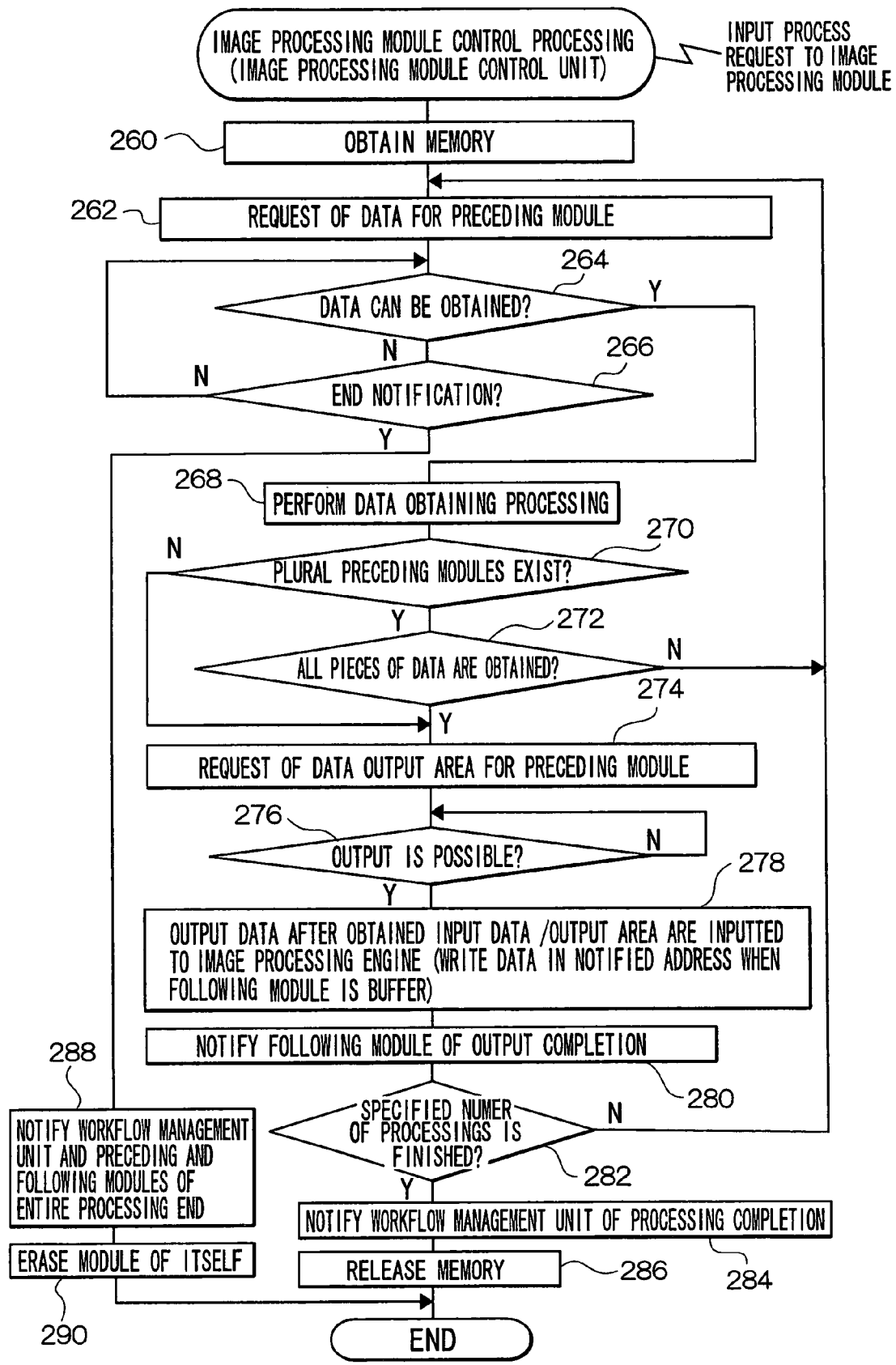

F I G. 1 1
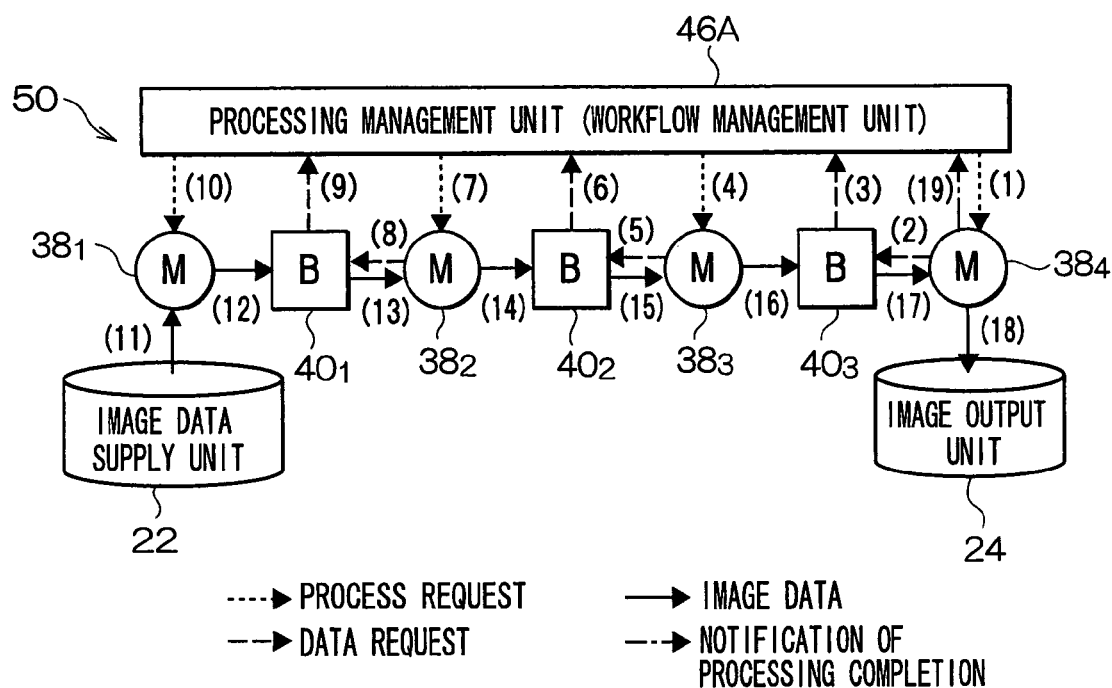

IMAGE PROCESSING APPARATUS, STORAGE MEDIUM IN WHICH IMAGE PROCESSING PROGRAM IS STORED, AND IMAGE PROCESSING METHOD

CROSS-REFERENCE TO RELATED APPLICATION

This application is based on and claims priority under 35 USC 119 from Japanese Patent Application No. 2006-194416 filed Jul. 14, 2006.

BACKGROUND

1. Technical Field

The present invention relates to an image processing apparatus, a storage medium in which an image processing program is stored, and an image processing method.

2. Related Art

Various image processings such as scaling, rotation, affine transformation, color conversion, filtering, and image synthesis are performed to inputted image data in an image processing apparatus which performs the image processing on the image data, a DTP (Disk Top Publishing) system which can deal with the image, and a print system in which the image expressed by the inputted image data is recorded at a recording material. In such a system and apparatus, the image processing is sometimes performed with dedicated hardware when the attributes of the inputted image data and the content, procedure, and parameters of the image processing are fixed for the image data. For example, when various pieces of image data having different color spaces and different bit number per one pixel are inputted and the content, procedure, and parameters of the image processing changed in various ways, it is necessary that the performed image processing has a flexibly variable configuration.

SUMMARY

An image processing apparatus according to an aspect of the present invention includes a first storage unit that stores a program of at least one module including a buffer module from among modules, connected in a pipeline form or a directed acyclic graph form, of an image processing unit that is constructed such that a buffer module is connected at preceding and/or following stages of at least one image processing module, the image processing module performing predetermined image processing to image data obtained from a preceding module of the image processing module, and outputting processed image data or a processing result to a following module of the image processing module, and the buffer module allowing writing to a buffer of the image data which is output from a preceding module of the buffer module and allowing reading of the image data stored in the buffer by a following module of the buffer module; a second storage unit configured to additionally store an image processing program and a shared library, the image processing program performing an image processing and a program of a module generation unit being registered in the shared library, the module generation unit generating the image processing program as the image processing module based on a module generation parameter provided thereto; a control unit that, each time the control unit is notified of generation of a given module constituting the image processing unit during construction of the image processing unit, retains information on the generated module as notified, as construction information, instructs at least one image processing module constituting the constructed image processing unit to perform the image processing based on the construction information, and thereby causes the image processing unit to perform the image processing; and a construction unit that constructs the image processing unit to be constructed by: (a) generating an image processing module that, among the modules constituting the constructed image processing unit and linked in advance to the program of the at least one module stored in the first storage unit, has the program stored in the first storage unit, by reading the program from the first storage unit and loading the program at a computer memory, (b) notifying the control unit of the generation of the module, (c) generating a module whose program is not stored in the first storage unit, by searching the shared library stored in the second storage unit, dynamically loading the program at the computer memory, and providing the module generation parameter to the module generation unit to generate the image processing module, and (d) notifying the control unit of the generation of the image processing module or causing the module generation unit to notify the control unit of the generation of the image processing module.

BRIEF DESCRIPTION OF THE DRAWINGS

Exemplary embodiments of the present invention will be described in detail based on the following figures, wherein:

FIG. 5 shows a sequence for explaining an exemplary series of processings from construction of the image processing unit until execution of image processing;

FIG. 7 is a flowchart showing the contents of an image processing module generation processing performed by a processing module generation function;

FIG. 8A shows an exemplary case in which image data of a write target spreads across plural retaining unit buffer areas, FIG. 8B shows an exemplary case in which the image data of the write target spreads across plural retaining unit buffer areas, and FIG. 8C shows an exemplary case in which the image data of the write target spreads across plural retaining unit buffer areas;

FIG. 9A shows an exemplary case in which image data of a read target spreads across plural retaining unit buffer areas, FIG. 9B shows an exemplary case in which the image data of the read target spreads across plural retaining unit buffer areas, and FIG. 9C shows an exemplary case in which the image data of the read target spreads across plural retaining unit buffer areas;

FIG. 10 is a flowchart showing the contents of an image processing module control processing performed by a control unit of the image processing module;

FIG. 11 shows the sequence of an image processing in the image processing unit;

DETAILED DESCRIPTION

Figure 1:
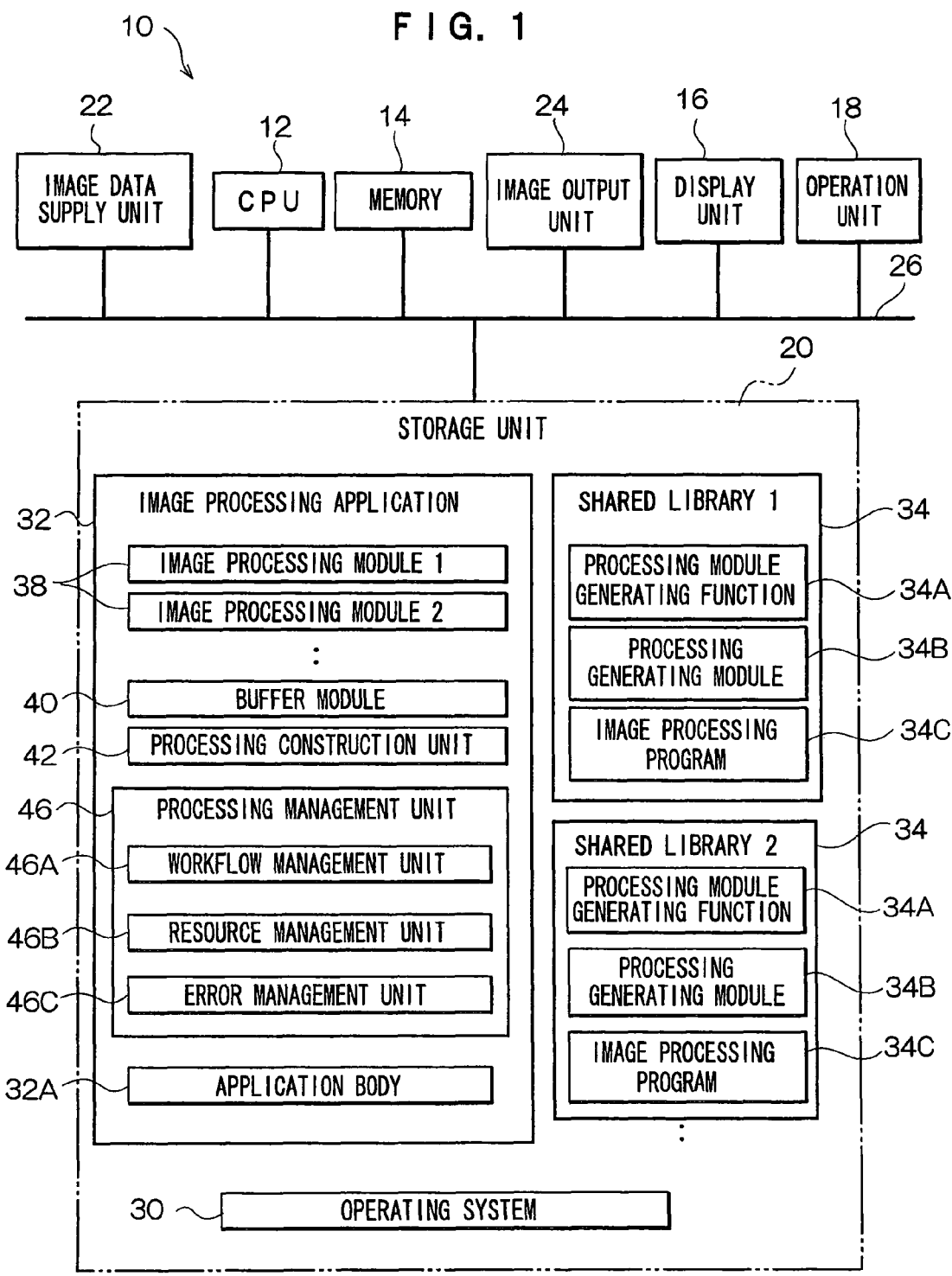
FIG. 1 is a block diagram showing a schematic configuration of a computer (image processing apparatus) according to an exemplary embodiment of the invention.

An exemplary embodiment of the present invention will be described in detail with reference to the accompanying drawings. FIG. 1 shows a computer 10 which can function as an image processing apparatus according to the exemplary embodiment. The computer 10 may be incorporated into an imaging device within which image processing is performed, such as a copying machine, a printer, a facsimile, a multifunction device in which these functions are combined, a scanner, or a photographic printer. Further the computer 10 may be an independent computer such as a personal computer (PC), or a computer incorporated into a portable instrument such as a PDA (Personal Digital Assistant) or a portable telephone.

The computer 10 includes CPU 12 as a program execution resource, a memory 14, a display unit 16, an operation unit 18, a storage unit 20, an image data supply unit 22, and an image output unit 24. These units are connected to one another via a bus 26. When the computer 10 is incorporated into an imaging device, an LCD display panel and a keypad that are provided in the imaging device can be used as the display unit 16 and the operation unit 18. When the computer 10 is an independent computer, a display device, a keyboard, and a mouse that are connected to the computer can be used as the display unit 16 and the operation unit 18. An HDD (Hard Disk Drive) can be used as the storage unit 20. Alternatively, other non-volatile storage devices such as a flash memory may be used in place of an HDD.

Any unit which supplies image data for a processing target can be used as the image data supply unit 22. Examples of the image data supply unit 22 include an image reading unit which reads an image recorded at a recording member such as paper or photographic film and outputs image data, a reception unit which receives the image data from the outside through a communication line, and an image storage unit (memory 14 or storage unit 20) in which the image data is stored. Any unit which outputs image data that has already been subjected to image processing or an image expressed by the image data can be used as the image output unit 24. Examples of the image output unit 24 include an image recording unit which records the image expressed by the image data at a recording member such as paper or a photosensitive material, a display unit which displays the image expressed by the image data, a writing device which writes the image data to a recording medium, a transmission unit which transmits the image data through a communication line, and an image storage unit (memory 14 or storage unit 20) in which the image data that has already been subjected to image processing is simply stored.

As shown in FIG. 1, various programs executed by CPU 12, i.e., programs of an operating system 30, an image processing application 32, and a shared library 34 are stored (installed) in the storage unit 20. The program of the operating system 30 performs management of resources such as the memory 14, management of programs executed by CPU 12, and controls communication between the computer 10 and the outside.

The program of the image processing application 32 causes the computer 10 to function as the image processing apparatus of the exemplary embodiment such that a desired image processing is performed by the computer 10. In the shared library 34, programs (program of processing module generation function 34A, program of processing generation module 34B, and image processing program 34C) which can be used to construct an image processing unit 50 (i.e., to generate an image processing module 38, which is described later) are registered. Thus, the storage unit 20 corresponds to a first storage unit and a second storage unit according to the exemplary embodiment. The program of the image processing application 32 corresponds to an image processing program according to the exemplary embodiment.

Figure 2:
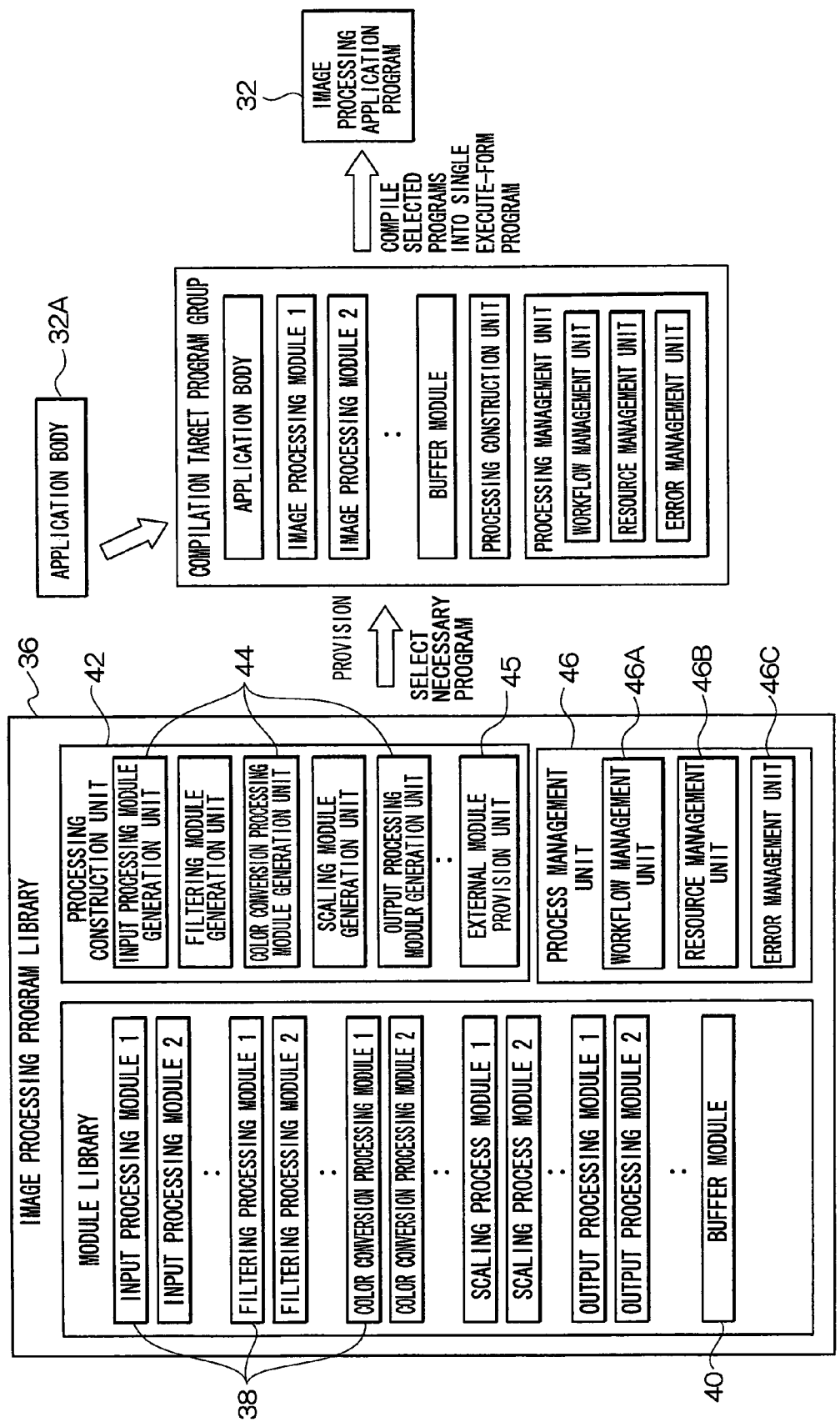
FIG. 2 shows an exemplary procedure of generating an image processing application.

Next, details of the image processing application 32 (and a program thereof) will be described. In the exemplary embodiment, an image processing program library 36 shown in FIG. 2 is prepared as a library for generating the image processing application 32. An image processing program group registered in the image processing program library 36 reduces the burden of development when developing various imaging devices or portable devices, and reduces the burden of development when developing an image processing program which can be used in a PC or the like. The image processing program group includes programs which are developed for standardized use in various devices (platform) such as imaging devices, portable devices, and PCs, and are used when the image processing application 32 is generated.

The image processing apparatus realized by the image processing application 32 constructs, according to a construction instruction from an application body 32A (see FIG. 2) included in the image processing application 32, an image processing unit which performs image processing instructed by the application body 32A, and the image processing apparatus performs the image processing using the image processing unit according to an execute instruction from the application body 32A (details described later). The image processing program group registered in the image processing program library 36 provides, to the application body 32A, an interface for instructing the construction of the image processing unit (an image processing unit having a desired configuration) which performs a desired image processing, and/or for instructing execution of the image processing by the constructed image processing unit. Therefore, when any device in which image processing is to be performed therein is newly developed, regarding the development of the application 32, only the application body 32A, which instructs the construction of the image processing unit necessary for the device and the execution of the image processing needs to be developed using the interfaces provided with the image processing program group.

As shown in FIG. 2, the image processing program library 36 can be broadly divided into a module library in which a program of an image processing module is registered, a library in which a program of a processing construction unit 42 is registered, and a library in which a program of a processing management unit 46 is registered. Although the details are described later, the processing construction unit 42 of the exemplary embodiment constructs an image processing unit 50 in response to an instruction from the application body 32A. As shown in FIG. 3, the image processing unit 50 is formed of at least one image processing module 38, which performs predetermined image processing, and a buffer module 40 includes a buffer for storing image data and arranged at a preceding and/or following stage of an individual image processing module 38. The image processing unit 50 is formed by connecting the image processing modules 38 and the buffer modules 40 in a pipeline form or a DAG (Directed Acyclic Graph) form. The instance of the image processing modules constituting the image processing unit 50 may be a first program which is executed by the CPU 12, and causes the CPU 12 to perform the predetermined image processing, or a second program which is executed by CPU 12, and causes the CPU 12 to instruct an external image processing apparatus (for example, a dedicated image processing board: not shown in FIG. 1) to perform the image processing. Programs of plural types of image processing modules 38 are registered in the module library. The programs respectively perform various predetermined types of image processings (for example, input processing, filtering, color conversion processing, scaling, skew angle detection processing, image rotation processing, image synthesis processing, and output processing). For the sake of simple explanation, it is assumed that the first program is the instance of each of the image processing modules constituting the image processing unit 50.

Figure 4A:
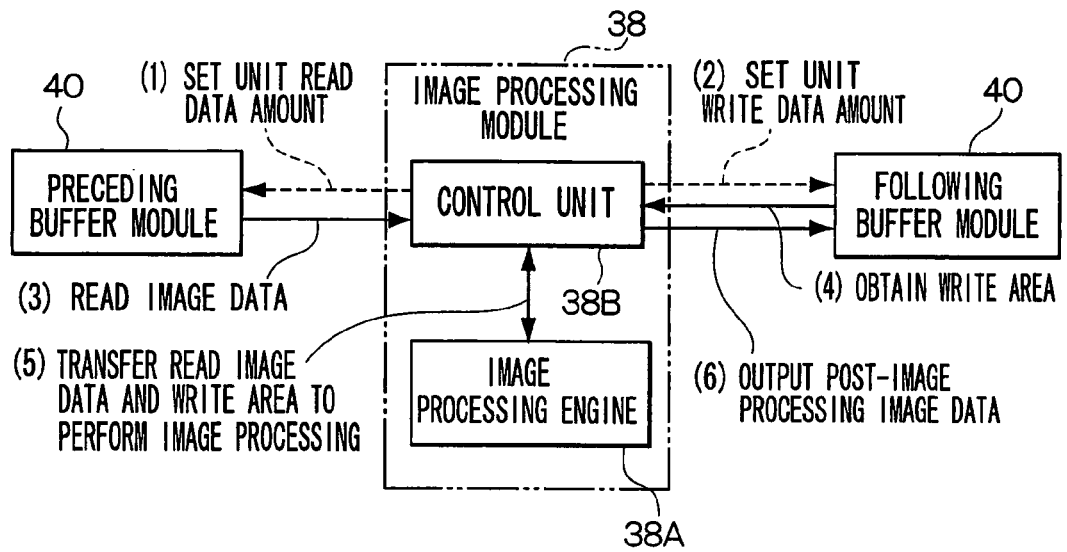
FIG. 4A is a block diagram showing an exemplary configuration of an image processing module and a series of processings performed by the image processing module.

As shown in FIG. 4A, the image processing module 38 includes an image processing engine 38A and a control unit 38B. The image processing engine 38A performs the image processing to the image data for each predetermined unit processing data amount. The control unit 38B controls the image processing engine 38A, and the control unit 38B also controls input and output of the image data between the preceding and following modules of the image processing module 38. The unit processing data amount in each image processing module 38 is previously selected and set from any number of bytes corresponding to one line of the image, plural lines of the image, one pixel of the image, one screen of the image, and the like, according to the type of the image processing performed by the image processing engine 38A. For example, when the image processing module 38 performs a color conversion processing or a filtering, the unit processing data amount may be set to one pixel. When the image processing module 38 performs a scaling, the unit processing data amount may be set to one line or plural lines of the image. When the image processing module 38 performs image rotation processing, the unit processing data amount may be set to one screen of the image. When the image processing module 38 performs image compression and decompression processing, the unit processing data amount may be set to N bytes depending on the execution environment.

Image processing modules 38 having the same type of the image processing performed by the image processing engine 38A but having different contents of the image processing may be also registered in the module library (in FIG. 2, this type of image processing module is referred to as "module 1", "module 2", . . . ). For example, an image processing module 38 which performs contraction of the inputted image data to 50% by thinning the pixels by every other pixel, an image processing module 38 which performs scaling at a scaling ratio specified to the inputted image data, and the like are respectively prepared for plural image processing modules 38 which performs the scaling or contraction. Further, for an image processing module 38 which performs color conversion processing, for example, an image processing module 38 which converts an RGB color space into a CMY color space, an image processing module 38 which converts a CMY color space into an RGB color space, and an image processing module 38 which performs other color space conversions such as conversion to an L*a*b* color space are prepared.

In order to input the image data necessary for the image processing engine 38A to process at each unit processing data amount, the control unit 38B of the image processing module 38 obtains the image data in a unit read data amount from a preceding module (for example, buffer module 40) to the image processing module 38, and outputs the image data output from the image processing engine 38A in a unit write data amount to a following module (for example, buffer module 40). The unit write data amount is equal to the unit processing data amount unless the image processing engine 38A performs an image processing such as compressing in which the data amount is increased or decreased. Alternatively, the control unit 38B outputs a result of the image processing performed by the image processing engine 38A to the outside of the image processing module 38 (for example, when the image processing engine 38A performs image analysis processing such as skew angle detection processing, the image analysis processing result such as a skew angle detection result may be output instead of the image data). Image processing modules 38 having the same type and content of image processing performed by the image processing engine 38A but having a different unit processing data amount, unit read data amount, and unit write data amount, may also be registered in the module library. Further, for the image processing module 38 which performs the image rotation processing, for example, in addition to the program of an image processing module 38 in which the unit processing data amount is one screen of the image, a program of an image processing module 38 in which the unit processing data amount is one line or plural lines of the image may be registered in the module library.

The program of each image processing module 38 which is registered in the module library includes a program of the image processing engine 38A and a program of the control unit 38B, and the program of the control unit 38B is formed into a component. Among the image processing modules 38 having the same unit read data amount and unit write data amount, the program of the control unit 38B of such image processing modules 38 is commonly shared irrespective of the type and contents of the image processing performed by the image processing engine 38A (i.e., the same single program is used as the program of the control unit 38B).

Among the image processing modules 38, there is a module in which the unit read data amount and unit write data amount are not fixed when an attribute of the inputted image data is unknown, but fixed when the attribute of the inputted image data is obtained and a computation by substitution of the attribute with a predetermined operational expression is performed. For this type of image processing module 38, for image processing modules 38 in which the unit read data amount and the unit write data amount can be derived from the same expression, the program of the control unit 38B thereof can be used in common.

Figure 4B:
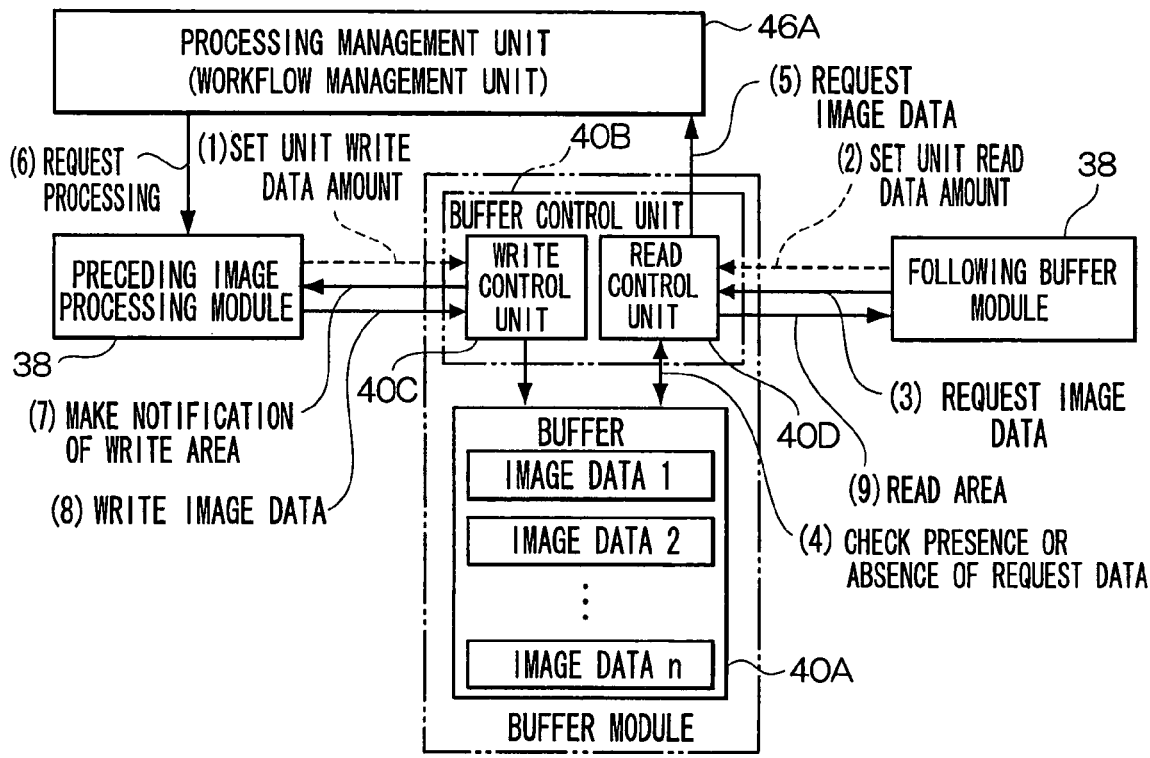
FIG. 4B is a block diagram showing an exemplary configuration of a buffer module and a series of processings performed by the buffer module.

As shown, for example, in FIG. 4B, each buffer module 40 constituting the image processing unit 50 includes a buffer 40A and a buffer control unit 40B. The buffer 40A is formed of a memory area which is reserved in the memory 14 provided in the computer 10 through the operating system 30. The buffer control unit 40B manages the buffer 40A and the input and output of the image data between the preceding and following modules of the buffer module 40. The instance of the buffer control unit 40B of each buffer module 40 is also a program executed by CPU 12. A program of the buffer control unit 40B is also registered in the module library (in FIG. 2, the program of the buffer control unit 40B is referred to as a "buffer module").

As shown in FIG. 2, plural types of module generation units 44 are registered in the library where the program of the processing construction unit 42 is registered. Each of the plural types of the module generation units 44 respectively corresponds to a different image processing. When activated by the application body 32A, each of the plural types of the module generation units 44 performs a processing for generating a module group, which is formed of the image processing module 38 and the buffer module 40, for realizing the corresponding image processing. In FIG. 2, the module generation units 44 corresponding to the types of the image processing performed by each of the image processing modules 38 registered in the module library are shown as examples. However, the image processing corresponding to each of the module generation units 44 may be an image processing realized by plural types of the image processing modules 38 (for example, skew correction processing including skew angle detection processing and image rotation processing). Further, a program of an external module provision unit 45 may also be registered in the library of the processing construction unit 42. The external module provision unit 45 may be used to generate the image processing module 38 by utilizing the image processing program 34C registered in the shared library 34. The processing construction unit 42 including the external module provision unit 45 corresponds to a construction unit of the exemplary embodiment.

As shown in FIG. 2, programs of a workflow management unit 46A, a resource management unit 46B, and an error management unit 46C, which are programs of the processing management unit 46 are registered in the library where the program of the processing management unit 46 is registered. The workflow management unit 46A controls the image processing performed by the image processing unit 50. The resource management unit 46B manages the resources of the computer 10, such as the memory 14 and various files, which are used by the modules of the image processing unit 50. The error management unit 46C manages errors that occur in the image processing unit 50. The processing management unit 46 corresponds to a control unit according to the exemplary embodiment.

In order to generate the program of the image processing application 32, firstly the program of the application body 32A, which instructs the construction of the image processing unit necessary to perform the image processing and instructs the performance of the image processing, is developed by utilizing the interface provided by the image processing program group registered in the image processing program library 36. Then, as shown in FIG. 2, programs necessary for constructing the image processing unit 50 or for performing the image processing by the image processing unit 50 are selected from the image processing program group registered in the image processing program library 36. The program of the image processing application 32 is generated by compiling the selected programs and the program of the application body 32A (compilation target program group shown in FIG. 2) into a single program of execution form. The program of the image processing application 32 corresponds to "a single processing program having an execute form" according to the exemplary embodiment.

The programs (compilation target program group) necessary for constructing the image processing unit 50 or for performing the image processing by the image processing unit 50 vary greatly depending on the processing content to be implemented by the program of the application body 32A. However, for the program of the processing management unit 46, all the programs (the programs of the workflow management unit 46A, the resource management unit 46B, and the error management unit 46C) registered in the library are always selected as the compilation target program group.

That is, when the application body 32A constructs a fixed image processing unit 50 having a fixed configuration that performs an image processing having a fixed processing content, only the programs of the image processing module 38 and the buffer module which constitute the fixed image processing unit 50 are selected from the module library, and only the program of the corresponding module generation unit 44 is selected from the library of the processing construction unit 42, as the compilation target program group. When the configuration of the image processing unit 50 which the application body 32A constructs and/or the contents of the image processing the application body 32A causes to be performed are not fixed (for example, when the format of the image data of the processing target is not fixed and the application body 32A constructs the image processing unit 50 according to the format of the image data of the processing target, or when the application body 32A constructs different image processing units 50 according to the instruction inputted from a user through the operation unit 18), all the programs of the image processing modules 38 and buffer modules which may possibly be used are selected from the module library, and all the programs of the corresponding module generation units 44 are selected from the library of the processing construction unit 42, as the compilation target program group.

Further, during the generation (during compilation) of the program of the image processing application 32, depending on the contents of the image processing performed by the image processing unit 50, it may be necessary to construct an image processing unit 50 including an image processing module 38 which performs an image processing whose corresponding program is not registered in the module library. Specifically, when the format of the image data of the processing target is not fixed and an image processing unit 50 having processing content according to the format of the image data of the processing target is constructed, anew format may emerge as a format of the image data, and a new image processing program may be developed to deal with the newly-emerged format of the image data, after the program of the image processing application 32 is generated.

As described above, when there is a possibility that the image processing unit 50 may be constructed with a new image processing program which does not exist when the program of the image processing application 32 is generated, in the exemplary embodiment, the program of the external module provision unit 45 may also be selected as the compilation target program group from the library of the processing construction unit 42 to generate (compile) the program of the image processing application 32. Further, when a new image processing program exists in the computer 10 in which the image processing application 32, into which the external module provision unit 45 is incorporated, is installed in the storage unit 20, and when there is a possibility that the image processing unit 50 may be constructed using the new image processing program, the shared library 34, in which the new image processing program 34C that may possibly be used, the program of the processing module generation function 34A, and the program of the processing generation module 34B are registered, may be stored in the storage unit 20 of the computer 10, as shown in FIG. 1.

Plural shared libraries 34 in which different image processing programs 34C are registered may be stored in the storage unit 20 of the computer 10 (FIG. 1 shows the state in which the plural shared libraries 34 are stored). However, the programs of the processing module generation function 34A and processing generation module 34B are respectively formed into components, and the same programs are registered as the programs of the processing module generation function 34A and processing generation module 34B in each of the shared libraries 34. Therefore, when the new image processing program 34C is developed, the working load for storing the shared library 34, in which the image processing program 34C is registered, in the storage unit 20 may be reduced. The processing module generation function 34A and the processing generation module 34B correspond to the module generation unit according to the exemplary embodiment. Particularly, the processing module generation function 34A which performs the image processing module generation processing (described in detail later) shown in FIG. 7 corresponds to a second module generation unit of the exemplary embodiment. The processing generation module 34B corresponds to a first module generation unit of the exemplary embodiment, and the external module provision unit 45 corresponds to a construction unit of the exemplary embodiment.

Next, operations of the exemplary embodiment will be described. In the following description, it is assumed that the program of the image processing application 32 into which the program of the external module provision unit 45 is incorporated is installed in the storage unit 20 of the computer 10. It is also assumed that the shared library 34 is stored in the storage unit 20 of the computer 10.

In the computer 10 in which the program of the image processing application 32 is installed, when a situation arises in which performance of some type of image processing is required, the image processing application 32 (i.e., the application body 32A incorporated therein) detects this situation. Examples of a situation in which the performance of some type of image processing is required include: when the image processing application 32 is already started and the image is read by an image reading unit serving as the image data supply unit 22, and when instructed by a user to execute a job including recording the image at a recording member using an image recording unit serving as the image output unit 24, displaying the image at a display unit serving as the image output unit 24, writing the image at a recording medium using a writing unit serving as the image output unit 24, transmitting the image data using a transmission unit serving as the image output unit 24, or storing the image data at an image storage unit serving as the image output unit 24; or with respect to image data received by a reception unit serving as the image data supply unit 22 or image data stored in an image storage unit serving as the image data supply unit 22, when instructed by a user to execute a job including recording the image data at the recording member, displaying the image data at the display unit, writing the image data at the recording medium, transmitting, and storing the image data at the image storage unit. Situations in which the performance of some type of image processing is required are not limited to the above examples and include, for example, a situation in which, when the image processing application 32 displays a list of the names of performable processings on the display unit 16 according to an instruction from a user, the execute target processing is selected by a user or the image processing application 32 is simply activated.

When the image processing application 32 detects a situation in which a certain image processing needed to be performed, the application body 32A recognizes the type of image data supply unit 22 which supplies the image data of the image processing target (see Step 150 of FIG. 5). When the recognized type is a buffer area, i.e., a part of the area of the memory 14, (when determination in Step 152 of FIG. 5 is affirmative), the application body 32A activates the processing construction unit 42 incorporated into the image processing application 32, and causes the processing construction unit 42 to generate the buffer module 40 including the buffer area which is specified as the image data supply unit 22 (see Step 154 of FIG. 5). The buffer module 40 can be generated by loading the program of the buffer module 40 (i.e., the buffer control unit 40B) to the memory 14 to be executable by CPU 12, and setting a parameter for the buffer control unit 40B to recognize the assigned buffer area as the buffer module 40. The generated buffer module 40 functions as the image data supply unit 22.

Next, the application body 32A recognizes the type of the image output unit 24 serving as an output destination for the image data to which the image processing is performed (see Step 156 of FIG. 5). When the recognized type is a buffer area, i.e., a part of the area of the memory 14, (when determination in Step 158 of FIG. 5 is affirmative), the application body 32A activates the processing construction unit 42 if the processing construction unit 42 is not activated yet. Then, the application body 32A causes the processing construction unit 42 to generate the buffer module 40 including the buffer area which is assigned as the image output unit 24 (see Step 160 of FIG. 5). The generated buffer module 40 functions as the image output unit 24.

Then, the application body 32A recognizes the contents of the image processing to be performed, divides the image processing into a combination of image processings having a level corresponding to the individual module generation units 44, and determines the type of the image processing necessary to implement the image processing to be performed and the order in which the image processings should be performed (see Step 162 of FIG. 5). When the application body 32A causes construction of an image processing unit 50 having a configuration corresponding to a job for which execution has been instructed by a user, in order to cause performance of the image processing, the type of the image processing and the performance order may be registered in advance in a table incorporated into the image processing application 32, correlating with the types of job for which execution thereof can be instructed by the user. Then, the application body 32A can perform the determination by reading the information corresponding to the type of job for which execution is instructed. When the application body 32A constructs an image processing unit 50 having a fixed configuration to perform a image processing having a fixed processing content, the determination may be made only by referring to the information (the above described type of image processing and performance order) registered in advance in the table incorporated into the image processing application 32.

Then, on the basis of the determined type of image processing and performance order, the application body 32A determines whether or not a program of the image processing module 38, which executes an $n_{th}$ (the initial value of n is 1) specific image processing in the performance order, is incorporated into the image processing application 32. When the program of the image processing module 38 which performs the specific image processing is incorporated into the image processing application 32, the module generation unit 44 corresponding to the specific image processing, among the module generation units 44 of the processing construction unit 42 whose program is incorporated into the image processing application 32, is activated. When the program of the image processing module 38 is not incorporated into the image processing application 32, the external module provision unit 45 of the processing construction unit 42 is activated (see Step 164 of FIG. 5).

The application body 32A determines whether the module generation unit 44 or the external module provision unit 45 should be activated. Alternatively, the application body 32A may be configured to activate the external module provision unit 45 when the module generation unit 44 notifies the application body 32A that the program of the image processing module 38 is not incorporated into the image processing application 32, as a result of the module generation processing (described later) performed by the activated module generation unit 44.

The application body 32A notifies the activated module generation unit 44 or external module provision unit 45 of the parameter (module generation processing parameter) which is necessary to generate the module (group) which performs the specific image processing, and instructs the generation of the module (group) (see Step 166 of FIG. 5). Examples of the module generation processing parameter include: input module identification information for identifying an input module which inputs the image data to the module (group) of the generating target, output module identification information for identifying an output module to which the module (group) of the generation target outputs the image data, input image attribute information for indicating an attribute of the image data inputted to the module (group) of the generation target, and a parameter of the image processing to be performed. When the specific image processing is implemented by combining plural types of image processing modules 38 whose programs are incorporated into the image processing application 32, when the instructed module generation unit 44 notifies the application body 32A that the generation of the module group is completed, the application body 32A repeatedly performs processing of activating the module generation unit 44 corresponding to a single image processing and notifying the module generation unit 44 of the information necessary to generate the module (group), in the ascending order of performance order of the plural types of image processings which implement the specific image processing.

The image data supply unit 22 becomes the input module for the first module group in the performance order, and the final module (usually a buffer module 40) of the preceding module group becomes the input module for the subsequent module groups in the performance order. Regarding the output module, for the final module group in the performance order, the image output unit 24 is specified as the output module. However, in other module groups, because the output module is not fixed, the specification of the output module may not be performed by the application body 32A, but the output module is generated and set by the module generation unit 44 if needed. The input image attribute and the image processing parameter may be, for example, registered in advance as information correlated with the type of job for which execution can be instructed by a user, so that the application body 32A can recognize the input image attribute and the image processing parameter by reading the information corresponding to the type of job for which execution is instructed, or the user can specify the input image attribute and the image processing parameter. When the buffer module 40 exists in the preceding stage of the module (group) of the generation target, the input image attribute can be obtained by obtaining the attribute of the output image data from the further preceding image processing module 38, which writes the image data into the buffer module 40.

When a specific module generation unit 44 is activated and instructed to generate a module (group) which performs a specific image processing, the instructed module generation unit 44 performs a module generation processing (see Step 168 of FIG. 5). In the module generation processing, based on the input image attribute information included in the module generation processing parameter which the application body 32A notifies to the module generation unit 44, the module generation unit 44 determines whether or not the generation of the image processing module 38 of the generation target is required. For example, the module generation unit 44 may be a module generation unit which generates a module group for performing a color conversion processing, and the application body 32A may specify, with the image processing parameter, a CMY color space as the color space of the output image data. In such a case, when the input image data is found to be data of an RGB color space based on the obtained input image attribute information, it is necessary that an image processing module 38 which performs a color space conversion of an RGB color space into a CMY color space be generated as the image processing module 38 which performs the color space conversion processing. On the other hand, when the input image data is data of a CMY color space, because the attribute of the input image data matches with the attribute of the output image data regarding the color space, the module generation unit 44 determines that the generation of an image processing module 38 which performs the color space conversion processing is not required.

When the module generation unit 44 determines that the generation of the image processing module 38 of the generation target is required, the module generation unit 44 determines whether or not a following buffer module 40 is required at a following stage of the image processing module 38. The determination will be negative when the following module of the image processing module is the output module (image output unit 24) (for example, see the final image processing module 38 in the image processing unit 50 shown in FIGS. 3A to 3C), or when the image processing module is a module which performs an image processing such as analysis to the image data and outputs the result to another image processing module 38 (for example, see the image processing module 38 which performs the skew angle detection processing in the image processing unit 50 shown in FIG. 3B). In cases other than the above, the determination will be affirmative, and a buffer module 40 connected to a following stage of the image processing module 38 is generated.

Then, based on the information on the preceding module (for example, the buffer module 40), the information on the following buffer module 40 (only for the image processing module 38 in which a buffer module 40 is generated in a following module), the attribute of the image data inputted to the image processing module 38, and the processing parameter, the module generation unit 44 selects, among plural candidate modules of which the programs thereof are incorporated in the image processing application 32 and are available as image processing modules, an image processing module(s) which matches the previously-obtained attribute of the image data and the processing parameter to be executed by the image processing module 38. The module generation unit 44 loads the program of the selected image processing module 38 to the memory 14 to be executable by CPU 12, and sets a parameter that causes the control unit 38B of the image processing module 38 to recognize the preceding and following modules of the image processing module 38, thereby generating the image processing module 38.

For example, when the module generation unit 44 is a module generation unit which generates a module group for performing a color conversion processing, and a CMY color space is specified as the color space of the output image data by the processing parameter, and when the input image data is the data of an RGB color space, the image processing module 38 which performs color space conversion of an RGB color space into a CMY color space is selected and generated from among the plural types of image processing modules 38 whose programs are incorporated in the image processing application 32. When the image processing module is an image processing module 38 which performs scaling and the specified scaling ratio is other than 50%, an image processing module 38 which performs the scaling to the input image data at the specified scaling ratio may be selected and generated. When the scaling ratio is specified to 50%, the image processing module 38 which is specialized to perform the scaling at a scaling ratio of 50%; namely, the image processing module 38 that performs scale-down processing by thinning the input image data by every other pixel, is selected and generated.

The selection of the image processing module is not limited as described above. For example, programs of image processing modules 38 having different unit processing data amounts in the image processing performed by the image processing engine 38A may be incorporated into the image processing application 32, and an image processing module 38 having the appropriate unit processing data amount may be selected according to operation environments such as the size of the memory area which can be allocated to the image processing unit 50 (for example, an image processing module 38 having a smaller unit processing data amount is selected as the size of the memory area is decreased). Alternatively, the application body 32A or the user may select an image processing module 38 having the appropriate unit processing data amount.

When the generation of the image processing module 38 is completed, the processing management unit 46 is notified of a set of the ID of the following buffer module 40 and the ID of the generated image processing module 38. Any type of information may be used as an ID as long as the individual module can be uniquely identified. Examples of ID include a number given in the order in which the modules are generated and an on-memory address of an object of the buffer module 40 or image processing module 38. When the module generation unit 44 generates a module group which performs image processing (for example, the skew correction processing implemented by an image processing module 38 which performs askew angle detection processing and an image processing module 38 which performs an image rotation processing) implemented by plural types of the image processing modules 38, the above processing is repeated to generate a module group including two or more image processing modules 38.

Figure 6:
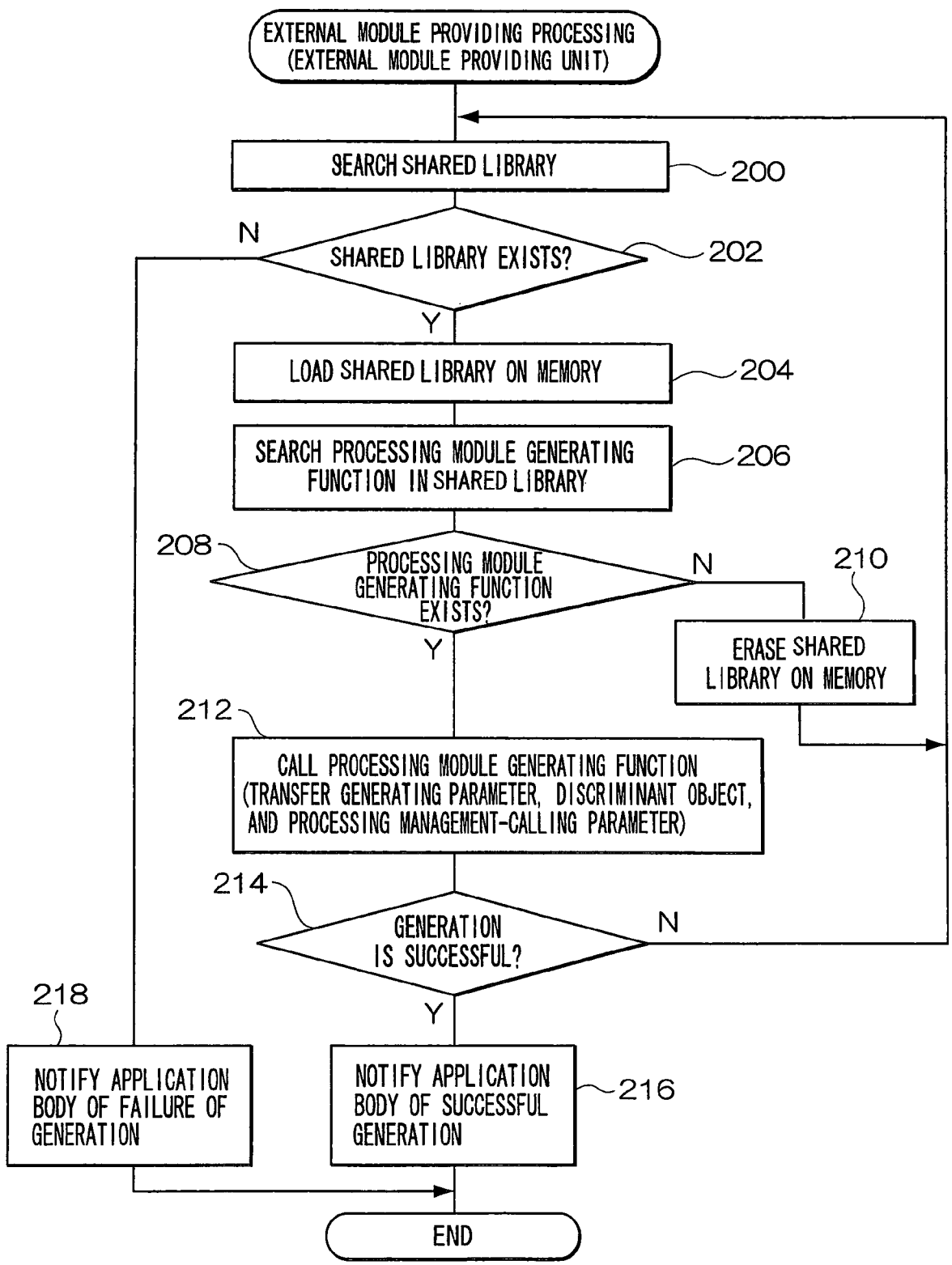
FIG. 6 is a flowchart showing the contents of an external module provision processing performed by an external module provision unit.

On the other hand, when the external module provision unit 45 is activated and generation of the module which performs the specific image processing is instructed, the external module provision unit 45 performs an external module provision processing (see Step 170 of FIG. 5). The external module provision processing will be described below with reference to FIG. 6.

In the external module provision processing, the shared library stored in the storage unit 20 is searched in Step 200. The search target in Step 200 is not limited to all the shared libraries stored in the storage unit 20. For example, a naming rule may be predefined for a shared library 34 in which the programs that can be used for the generation of the image processing module 38 are registered, and only a shared library whose name is matched to the naming rule may be set as the search target. In Step 202, the external module provision unit 45 determines whether or not a shared library is found in the search in Step 200. When the determination is negative in Step 202, the sequence proceeds to Step 218, and the application body 32A is notified of the failure of the generation of the module which performs the specific image processing, and the external module provision processing is terminated. When the shared library is found in the search in Step 200, the determination is affirmative in Step 202, the sequence proceeds to Step 204, and the found shared library is dynamically loaded to the memory 14.

In Step 206, the processing module generation function 34A which is registered in the shared library loaded to the memory 14 is searched. In next Step 208, the external module provision unit 45 determines whether or not the processing module generation function 34A is found in the search in Step 206. Shared libraries (for example, a shared library in which various types of DLL (Dynamic Link Library) are registered) other than shared libraries 34 in which the programs available for the generation of the image processing modules 38 are registered may be stored in the storage unit 20 of the computer 10. When the determination is negative in Step 208, the external module provision unit 45 may determine that the found shared library is a shared library which is not available for the generation of the image processing module 38. Therefore, the sequence proceeds to Step 210, the shared library dynamically loaded at the memory 14 is erased from the memory 14, and the sequence returns to Step 200. Thus, Steps 200 to 210 are repeated until a shared library 34 in which a program available for the generation of an image processing module 38 is registered, is found.

When the processing module generation function 34A is found in the search in Step 206, the external module provision unit 45 determines that the shared library dynamically loaded at the memory 14 is the shared library 34 in which the program available for the generation of the image processing module 38 is registered. Therefore, the determination in Step 208 will be affirmative, and the sequence proceeds to Step 212. In Step 212, the found processing module generation function 34A is called, and a module generation processing parameter notified from the application body 32A, a predetermined discriminant object, and a parameter for calling the processing management unit 46 are provided as arguments to the processing module generation function 34A. Thus, the processing module generation function 34A activates the processing generation module 34B and performs image processing module generation processing (see FIG. 7) to generate the image processing module 38. The processing module generation processing is described below.

Any type of highly confidential information can be used as the discriminant object as long as the processing module generation function 34A can discriminate the external module provision unit 45 from other units as the calling source. For example, the discriminant object may be information in which an execute code of the program of the external module provision unit 45 is added to the file name of the external module provision unit 45, or may be a hash value which is obtained by inputting the execute code of the program of the external module provision unit 45 to a hash function.

When the image processing module generation processing performed by the processing module generation function 34A is ended, and a response is returned from the processing module generation function 34A, in next Step 214, based on the response from the processing module generation function 34A, it is determined whether or not the image processing module 38 is successfully generated in the image processing module generation processing performed by the processing module generation function 34A. When the response from the processing module generation function 34A is null information signifying failure in the generation of the image processing module 38, the determination is negative, the sequence returns to Step 200, and the subsequent processings from Step 200 are performed again. When the response from the processing module generation function 34A is information signifying successful generation of the image processing module 38, the determination is affirmative, the sequence proceeds to Step 216, the application body 32A is notified of the successful generation of the image processing module 38, and the external module provision processing is terminated.

In Step 212 of the external module provision processing (see FIG. 6), the processing module generation function 34A (and processing generation module 34B) which is called from the external module provision unit 45, and to which the various types of information are provided as the argument, performs the image processing module generation processing shown in FIG. 7 (see also Step 172 of FIG. 5).

In the image processing module generation processing, the discriminant object provided as arguments from the external module provision unit 45 is validated by comparing the discriminant object to predetermined information in Step 240. In next Step 242, based on the validation result of the discriminant object, the processing module generation function 34A determines whether or not the calling source of the processing module generation function 34A is a proper calling source (i.e., the external module provision unit 45). When the determination is negative, the sequence proceeds to Step 254, the null information signifying failure in the generation of the image processing module 38 is provided to the calling source, and the image processing module generation processing is terminated. Thus, utilization of the shared library 34 (and the image processing program 34C registered therein) other than for the construction of the image processing unit 50 and the image processing performed by the image processing unit 50 by applications other than the image processing application 32 can be restricted. Alternatively, the validation of the discriminant object can be omitted, and the image processing program 34C registered in the shared library 34 utilized by any application.

As a result of the discriminant object validation in Step 242, when it is determined that the calling source of the processing module generation function 34A is the external module provision unit 45, the sequence proceeds to Step 244. In Step 244, the program of the processing generation module 34B registered in the same shared library 34 is executed as a thread through the operating system 30 by CPU 12, thereby activating the processing generation module 34B, and the module generation processing parameter provided from the external module provision unit 45 is provided as the argument to the processing generation module 34B.

Thereby, in next Step 246, the activated processing generation module 34B performs processing of generating the image processing program 34C registered in the same shared library 34 as the image processing module 38. That is, although not shown, a program corresponding to the control unit 38B (see FIG. 4A) of the image processing module 38 is also registered in the shared library 34 in addition to the image processing program 34C. The control unit 38B is generated by activating this program, and the information for recognizing the image processing program 34C registered in the same shared library 34 as the image processing engine 38A of the same image processing module 38 is set in the control unit 38B, along with the module generation processing parameter provided from the processing module generation function 34A. Thus an image processing module 38 including the image processing engine 38A and control unit 38B is generated.

When the module generation processing parameter is set, the control unit 38B of the generated image processing module 38 determines whether or not the contents of the image processing performed by the image processing engine 38A of the image processing module 38 (i.e., the image processing program 34C) conform with the provided module generation processing parameter. The determination can be performed by giving the input image attribute information or the processing parameter which is a part of the set module generation processing parameter to the image processing engine 38A, causing the image processing engine 38A to determine whether or not the image data of the attribute indicated by the input image attribute information can be processed, or whether or not the contents of the image processing performed by the image processing engine 38A conform with the contents of the image processing defined by the processing parameter, and obtaining the result of the determination result from the image processing engine 38A.

The result of the determination made by the control unit 38B is notified to the processing generation module 34B. When the processing generation module 34B is notified of a determination result that the contents of the image processing performed by the image processing engine 38A of the generated image processing module 38 conform with the module generation processing parameter, the processing generation module 34B notifies the processing module generation function 34A of the successful generation of the image processing module 38. On the other hand, when the processing generation module 34B is notified of a determination result that the contents of the image processing do not conform with the module generation processing parameter, execution of the programs of the control unit 38B and image processing engine 38A of the image processing module 38 (i.e., the image processing program 34C registered in the same shared library 34) by CPU 12 are stopped, and the processing generation module 34B notifies the processing module generation function 34A of failed generation of the image processing module 38.

When the processing module generation function 34A receives any notification from the processing generation module 34B, in next Step 248, the processing module generation function 34A determines whether or not the successful generation of the image processing module 38 is notified from the processing generation module 34B. When the determination is negative in Step 248, the sequence proceeds to Step 254, the null information signifying failed generation of the image processing module 38 is transferred to the calling source (corresponding to an error response of the exemplary embodiment), and the image processing module generation processing is terminated. In this case, in the external module provision unit 45 which is of the calling source of the processing module generation function 34A, a search for another shared library is resumed by the negative determination in Step 214 in the external module provision processing (see FIG. 6).

On the other hand, when the processing generation module 34B notifies the processing module generation function 34A of the successful generation of the image processing module 38 in Step 248, the sequence proceeds to Step 250, the processing module generation function 34A notifies the processing management unit 46 ID of the generated image processing module 38 based on a parameter for calling the processing management unit 46, which is transferred as the argument from the external module provision unit 45. Thereby, the generated image processing module 38 is recognized as a part of the image processing unit 50 (one of the image processing modules 38 constituting the image processing units 50) by the processing management unit 46, and is incorporated into the image processing unit 50.

In Step 252, information on the generated image processing module 38 is transferred to the calling source (corresponding to a normal response of the exemplary embodiment), and the image processing module generation processing is terminated. Thereby, the image processing module 38 is generated using an external program which is not incorporated into the image processing application 32, i.e., using the image processing program 34C registered in the shared library 34 stored in the storage unit 20. Accordingly, an image processing program 34C which can be used as the image processing module 38 constituting the image processing unit 50 can easily be added even after the generation (compilation) or installation of the image processing application 32 is completed.

The processing module generation function 34A and the processing generation module 34B are not limited to be configured for generating only the image processing module 38. A following buffer module 40 of the generated image processing module 38 may be continuously generated when the image processing module 38 is successfully generated.

Figure 3A:
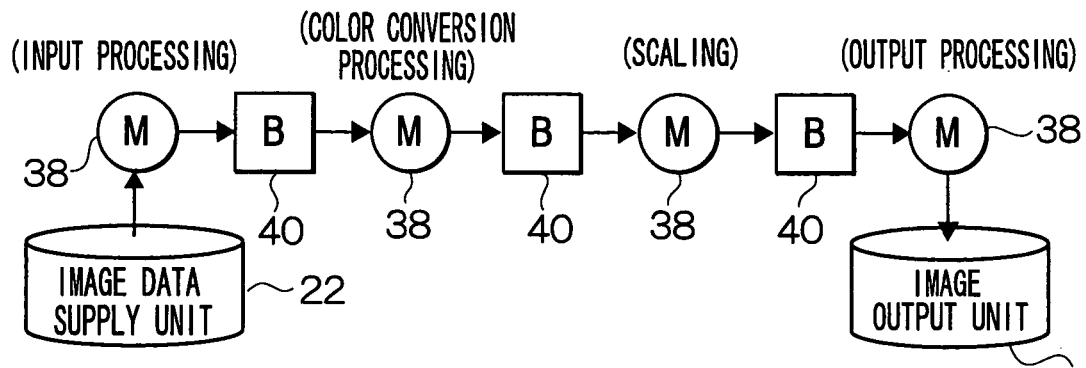
FIG. 3A is a block diagram showing an exemplary configuration of an image processing unit.
Figure 3B:
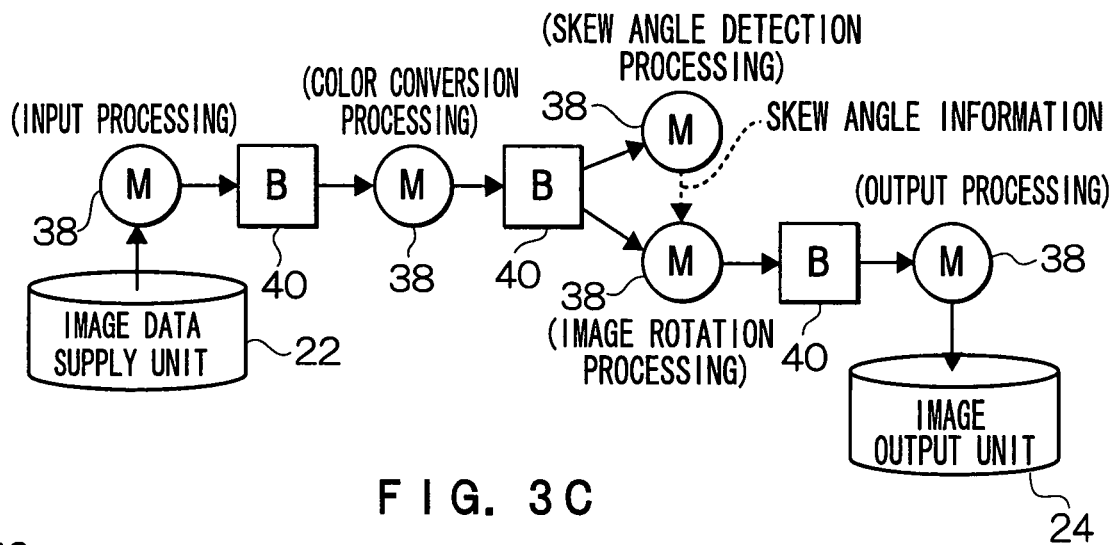
FIG. 3B is a block diagram showing an exemplary configuration of an image processing unit.
Figure 3C:
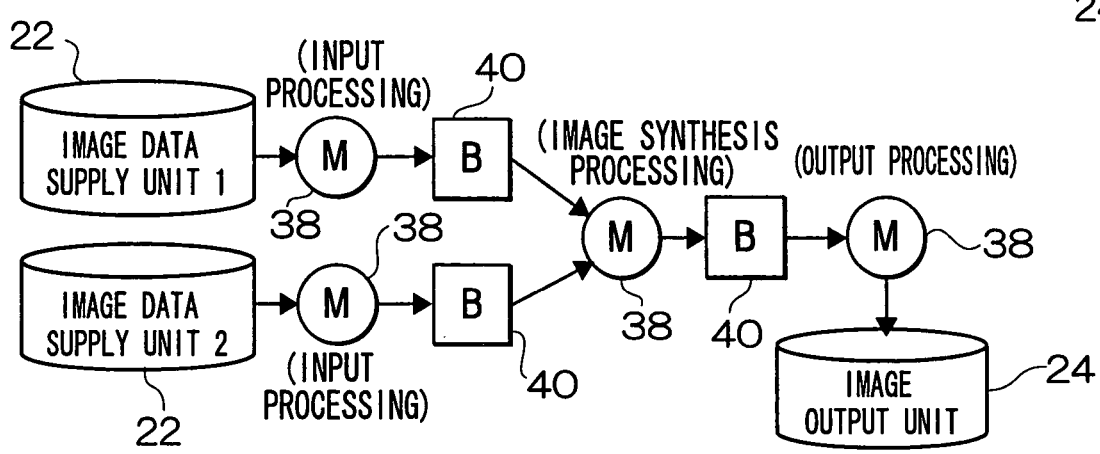
FIG. 3C is a block diagram showing an exemplary configuration of an image processing unit.

The image processing unit 50 which performs the necessary image processing can be constructed, for example as shown in FIGS. 3A to 3C, by having the above described module generation processing or the external module provision processing (see FIG. 6) sequentially performed by the module generation unit 44 or the external module provision unit 45 which are sequentially activated by the application body 32A. The operation of the constructed image processing unit 50 will be described below.

When the construction of the image processing unit 50 is completed, the application body 32A instructs the processing management unit 46 to cause the image processing unit 50 to execute the image processing (see Step 174 of FIG. 5). When the processing management unit 46 is instructed by the application body 32A to execute the image processing, the processing management unit 46 causes the CPU 12 to execute the program of each module of the image processing unit 50 loaded at the memory 14 as the thread via the operating system 30 (see Step 176 of FIG. 5).

Here, when the image processing unit 50 is operated as a parallel processing method in which the image processings are performed in parallel by the individual image processing modules 38 of the image processing unit 50, the processing management unit 46 causes the CPU 12 to respectively execute the programs of each modules constituting the image processing unit 50 as independent threads. The program of the buffer control unit 40B of the buffer module 40 is separated into a program of the write control unit 40C (see FIG. 4B) and a program of the read control unit 40D (see FIG. 4B). The write control unit 40C controls writing of the image data at the buffer 40A, and the read control unit 40D controls reading of the image data from the buffer 40A. The program of the write control unit 40C is executed as the same thread as the program of the image processing module 38 connected at the preceding stage of the buffer module 40. The program of the read control unit 40D is executed as the same thread as the program of the image processing module 38 connected at the following stage of the buffer module 40.

When the image processing unit 50 is operated as a serial processing in which the image processing is always performed by a single image processing module 38 among the image processing modules 38 of the image processing unit 50, and in which the image processing modules 38 which perform the image processing are serially switched, the processing management unit 46 causes the CPU 12 to execute the programs of all of the modules constituting the image processing unit 50 as a single thread. Alternatively, the CPU 12 may execute the program of each module as a process or an object instead of thread.

When the program of the image processing module 38 is executed as a thread, the control unit 38B of individual image processing module 38 initializes the module of itself. In the initialization of the image processing module 38, the control unit 38B determines the preceding module of the image processing module 38 based on the parameter set by the module generation unit 44. When the preceding module of the image processing module 38 does not exist, no processing is performed. However, when the preceding module is not a buffer module 40 but, for example, an image data supply unit 22 or a particular file, the initialization is performed if needed. When the buffer module 40 exists at a preceding stage of the image processing module 38, the control unit 38B recognizes an image data amount (unit read data amount) obtained at one reading of the image data from the preceding buffer module 40.

The number of unit read data amounts is one when the number of preceding buffer modules 40 of the image processing module 38 is one. However, as the image processing module 38 which performs the image synthesis processing in the image processing unit 50 as shown in FIG. 3C, and in which plural preceding buffer modules 40 exist and the image processing engine 38A performs the image processing using pieces of image data obtained respectively from the plural preceding buffer modules 40, the unit read data amount corresponding to each preceding buffer module 40 may be determined based on the type and contents of the image processing performed by the image processing engine 38A of its own, the number of the preceding buffer modules 40, and the like. The recognized unit read data amount is notified to all of the preceding buffer modules 40, and thereby the unit read data amount is set to all of the preceding buffer modules 40 (see (1) of FIG. 4A).

Then, the control unit 38B determines the following module of the own image processing module 38. When the following module is not the buffer module 40, but, for example, the image output unit 24 or a particular file, the initialization is performed if needed (for example, when the following module is the image output unit 24, processing of notification that the image data will be output by the data amount corresponding to the unit write data amount is performed). When the following module is the buffer module 40, the control unit 38B recognizes an image data amount (unit write data amount) for one writing of the image data, and the unit write data amount is set to the following buffer module (see (2) of FIG. 4A). Then the control unit 38B notifies the processing management unit 46 that initialization of the image processing module 38 is completed.

When the program of the buffer module 40 (the buffer control unit 40B) is performed as the thread, the buffer control unit 40B of each buffer module 40 initializes the buffer module 40 of itself. In the initialization of the buffer module 40, each time the unit write data amount is notified by the preceding image processing module 38, or the unit read data amount is notified by the following image processing module 38 of, the buffer control unit 40B stores the notified unit write data amount or unit read data amount (see (1) and (2) of FIG. 4B).

When the unit write data amount or unit read data amount is notified from all of the image processing modules 38 connected to the buffer module 40, the buffer control unit 40B determines a size of a unit buffer area based on the unit write data amount or unit read data amount respectively set by each of the image processing modules 38 connected to the buffer module 40. The unit buffer area is a management unit of the buffer 40A of the buffer module 40. The determined size of the unit buffer area is stored. It is preferable to set the size of the unit buffer area as the maximum value in the unit write data amount and unit read data amount that are set in the own buffer module 40. However, the unit write data amount may be set as the size of the unit buffer area. Alternatively, the unit read data amount may be set as the size of the unit buffer area (when plural following image processing modules 38 are connected to the buffer module 40, the maximum value in the unit read data amounts respectively set by the image processing modules may be set as the size of the unit buffer area). A lowest common multiple of (the maximum values of) the unit write data amount and unit read data amount may be also set as the size of the unit buffer area. The lowest common multiple may be set as the size of the unit buffer area when the lowest common multiple is lower than a predetermined value, and another value (for example, one of the maximum values of the unit write data amount and unit read data amount, the maximum value of the unit write data amount, or the maximum value of the unit read data amount) may be set as the size of the unit buffer area when the lowest common multiple is equal to or greater than the predetermined value.

When the buffer module 40 of itself is the buffer module 40 which functions as the image data supply unit 22 or the image output unit 24, the memory area used as the buffer 40A of the buffer module 40 of itself already exists. Therefore, the size of the unit buffer area is changed to the size of the already-existing memory area used as the buffer 40A of the buffer module 40 of itself. Further, valid data pointers corresponding to the following image processing modules 38 of the buffer module 40 of itself are generated respectively, and the generated valid data pointers are initialized. The valid data pointers indicate a head position (next read starting position) and an end position of the image data (valid data) which is not read by a corresponding following image processing module 38 among the image data written in the buffer 40A of the buffer module 40 of itself by the preceding image processing module. Usually, a specific item of information signifying that the valid data does not exist is set in the initialization of the valid pointer. However, when the buffer module 40 of itself is a buffer module 40 which acts as the image data supply unit 22, the image data of the image processing target may already be written in the memory area used as the buffer 40A of the buffer module 40. In such cases, the head position and end position of the image data are set as the valid data pointers corresponding to the respective following image processing modules 38. Thus, the initialization of the buffer module 40 is completed, and the buffer control unit 40B notifies the processing management unit 46 of the completion of the initialization.

When the processing management unit 46 is notified of the completion of the initialization from all of the modules constituting the image processing unit 50, the processing management unit 46 activates a thread (or a process or an object) which executes the program of the workflow management unit 46A, and instructs execution of the image processing by the image processing unit 50 to the workflow management unit 46A. The workflow management unit 46A inputs the processing request to the image processing modules 38 constituting the image processing unit 50, thereby causing the image processing unit 50 to perform the image processing. Processing performed by the buffer control unit 40B of each buffer module 40 and processing performed by the control unit 38B of the image processing module 38 will be described below prior to description of the operation of the entire image processing unit 50.

In the exemplary embodiment, the image processing module 38 inputs a write request to a buffer module 40 when the image processing module 38 writes the image data in the following buffer module 40. The image processing module 38 inputs a read request to the buffer module 40 when the image processing module 38 reads the image data from the preceding buffer module 40. When the preceding image processing module 38 inputs the write request to the buffer module 40 (and when a timer mentioned below expires), a data write processing described below is performed by the buffer control unit 40B (the write control unit 40C thereof).

In the data write processing performed by the buffer control unit 40B, the buffer control unit 40B determines whether or not access to the buffer 40A of the own buffer module 40 is already established. When the image processings are performed in parallel by the image processing modules 38 of the image processing unit 50, data is read from the buffer 40A when data is written in the buffer 40A in an asynchronous manner. Therefore, when access to the buffer 40A is already established, the inputted write request information is stored in a working memory or the like, the timer is started, and the data write processing is temporarily stopped. In the following processing, the inputted write request information is handled as the processing target information. However, when the data write processing is started again due to the expiration of the timer, the write request information stored in the working memory is read out from the working memory or the like, and the read-out write request information is handled as the processing target information to perform the following processing.

When the buffer control unit 40B determines that access to the buffer 40A is not established, then, in the data write processing, the unit write data amount, which is the memory area size to be reserved, is notified to the resource management unit 46B, and the memory area (writing buffer area, see FIG. 8B) used for writing data is obtained through the resource management unit 46B. Then, the buffer control unit 40B determines whether or not a unit buffer area having a free space equal to or more than the unit write data amount (a unit buffer area in which the image data having the unit write data amount can be written) exists in the unit buffer area for storing, which constitutes the buffer 40A of the own buffer module 40. Initially, in the buffer module 40, the memory area (unit buffer area) is not reserved as the buffer 40A, and the memory area is reserved as a unit of the unit buffer area each time the memory area runs out. Therefore, because the memory area (the unit buffer area) used as the buffer 40A does not exist when the write request is initially inputted to the buffer module 40, the determination will be negative. The determination will also be negative when the free space of the unit buffer area becomes smaller than the unit write data amount due to the writing of the image data in the unit buffer area after the unit buffer area used as the buffer 40A is reserved through a processing described below.

When it is determined that a unit buffer area having a free space equal to or more than the unit write data amount (a unit buffer area in which image data having the unit write data amount can be written) does not exist, the buffer control unit 40B notifies the resource management unit 46B of the memory area size (size of the unit buffer area) to be reserved, in order to obtain the memory area (the unit buffer area for storing the image data) used as the own buffer 40A, via the resource management unit 46B. The obtained buffer area for writing is set as the writing area, and the buffer control unit 40B notifies a head address of the write area to the image processing module 38 which is the source of the write request, and requests writing of the image data of the writing target in the writing buffer area in the order starting from the notified head address. Therefore, the image processing module 38 of the write request source writes the image data in the writing buffer area, the head address of which the image processing module 38 has been notified of (see FIG. 8B).

When the size of the unit buffer area is not an integral multiple of the unit write data amount, the writing of the image data having the unit write data amount in the buffer 40A (unit buffer area) is repeated. Therefore, as shown in FIG. 8A, a state in which the free space size is smaller than the unit write data amount is generated in the unit buffer area having the free space. In such a case, the area where the image data having the unit write data amount is written spreads across plural unit buffer areas. However, in the exemplary embodiment, because the memory area used as the buffer 40A is reserved in a unit of the unit buffer area, it is not always guaranteed that the unit buffer areas reserved at different timing are continuous at the real memory (memory 14). Therefore, in the exemplary embodiment, the image processing module 38 writes the image data in a writing buffer area which is reserved separately of the storing unit buffer area, and the image data temporarily written in the writing buffer area is copied in single or plural storing unit buffer areas as shown in FIG. 8C. Thus, regardless of whether or not the area where the image data is written spreads across plural unit buffer areas, when the image processing module 38 of the write request source is notified of the write area, it is necessary to notify the image processing module 38 only of the head address, thereby simplifying the interface with the image processing module 38.

When the own buffer module 40 is a buffer module 40 generated by the application body 32A, namely, when the memory area used as the buffer 40A is already reserved, the address of the already-reserved memory area is notified to the image processing module 38 as the address of the write area, and the image data is written in this memory area. When the writing of the image data in the write area is completed by the image processing module 38, the image data is written in the storing buffer area after attribute information is added to the image data written in the writing buffer area. When the size of the free space is smaller than the unit write data amount in the unit buffer unit having the free space as shown in FIG. 8C, the image data written in the writing buffer area may be separately written in plural storing unit buffer areas.

Then, among the valid data pointers corresponding to the respective following image processing modules 38 of itself, the pointer which indicates the end position of the valid data is updated such that the valid data end position indicated by the pointer is moved backward (i.e., further from the head position) by the unit write data amount (see FIG. 8C). A memory area previously reserved as the writing buffer area is released by the resource management unit 46B, and the data write processing is temporarily stopped. Alternatively, the writing buffer area may be reserved at the time of initialization of the buffer module 40, and the writing buffer area may be released at the time of erasing the buffer module 40.

Next, data read processing which may be performed by the buffer control unit 40B (the read control unit 40D thereof) of the buffer module 40 when a read request is inputted to the buffer module 40 from the following image processing module 38 (and when the timer described below expires) will be described.

In the data read processing performed by the buffer control unit 40B, firstly the buffer control unit 40B determines whether or not the current activation of the data read processing is due to the read request inputted from the following image processing module 38. When the determination is affirmative, the read request information inputted from the following image processing module is registered at the end of a reading queue. Then, the buffer control unit 40B determines whether or not access to the own buffer 40A is already established. When access to the buffer 40A is already established, the buffer control unit 40B determines whether or not the read request information is registered in the reading queue. When the read request information is not registered in the reading queue, the data read processing is terminated. When the read request information is registered in the reading queue, the timer is started and then the data read processing is terminated. When the timer expires, the data read processing is activated again, the unprocessed read request (information) registered in the reading queue is read out again, and the processing is performed according to the read request.

On the other hand, when access to the buffer 40A is not established, the first read request information is extracted from the reading queue. The buffer control unit 40B recognizes the image processing module 38 of the read request source based on request-source identification information included in the extracted read request information. The buffer control unit 40B recognizes the unit read data amount set by the image processing module 38 of the read request source, and also recognizes the head position and end position of the valid data of the image processing module 38, on the buffer 40A, based on the valid data pointer for the image processing module 38. Then, based on the recognized head position and end position of the valid data, the buffer control unit 40B determines whether or not the amount of the valid data for the image processing module 38 of the read request source (image data which can be read by the image processing module 38 of the read request source) is greater than the unit read data amount.

When the amount of the valid data for the image processing module 38 of the read request source is lower than the unit read data amount, the buffer control unit 40B determines whether or not the end of the valid data is the end of the image data of the processing target. When the amount of the valid data stored in the buffer 40A is greater than the unit read data amount, or when the amount of the valid data is lower than the unit read data amount but the end of the valid data is the end of the image data of the processing target, the resource management unit 46B is notified of the unit read data amount corresponding to the image processing module 38 of the read request source. The unit read data amount is the memory area size to be reserved. Then the buffer control unit 40B requests the resource management unit 46B to reserve the memory area used for reading the image data (reading buffer area: see FIG. 9B), and the buffer control unit 40B obtains the reading buffer area through the resource management unit 46B.

Then, the buffer control unit 40B reads a unit read data amount of the valid data of the read target from the buffer 40A, and writes the valid data in the reading buffer area. The buffer control unit 40B notifies the image processing module 38 of the read request source of the head address of the reading buffer area as the head address of the read area, and requests the image processing module 38 to sequentially read the image data from the notified head address. Thereby, the image processing module 38 of the read request source reads the image data from the read area (reading buffer area) in which the image processing module 38 is notified of the head address. When the valid data of the read target is the data corresponding to the end of the image data of the processing target, the buffer control unit 40B notifies the image processing module 38 of the read request source that the data is the end of the image data of the processing target in addition to the size of the image data of the read target, when the read request of the image data is made. When the own buffer module 40 is a buffer module 40 generated by the application body 32A, the memory area (a set of unit buffer areas) used as the buffer 40A is a continuous area. Therefore, the reservation of the reading buffer area and the writing of the image data of the read target in the reading buffer area may be omitted and the following image processing module 38 may directly read the image data from the unit buffer area.

As shown in FIG. 9A for example, when the amount of the valid data stored in a unit buffer area in which the head portion of the valid data is lower than the unit read data amount, and when the valid data of the read target spreads across plural unit buffer areas, it is not necessarily the case that the current valid data of the read target is stored in continuous areas on the real memory (memory 14). However, as shown in FIGS. 9B and 9C, in the data read processing, the image data of the read target is temporarily written in the reading buffer area, and is then read from the reading buffer area. Therefore, regardless of whether or not the image data of the read target is stored in plural unit buffer areas, for notification of the read area to the image processing module 38 of the read request source, it is only necessary to notify the head address of the image data of the read target, thereby simplifying the interface with the image processing module 38.

When the buffer control unit 40B is notified by the image processing module 38 of the read request source that the reading of the image data from the read area is completed, the buffer control unit 40B notifies the resource management unit 46B of the head address and size of the memory area reserved as the reading buffer area in order that the memory area is released by the resource management unit 46B. Alternatively, the reading buffer area may be reserved at the time of initialization of the buffer module 40, and the reading buffer area may be released when erasing the buffer module 40. Among the valid data pointers of the image processing module 38 of the read request source, the pointer which indicates the head position of the valid data is updated such that the head position of the valid data indicated by the pointer is moved backward by the unit read data amount (see FIG. 9C).

Then, the buffer control unit 40B respectively refers to the valid data pointers of the following image processing modules 38, and determines whether or not a unit buffer area in which all of the stored image data is read out by the following image processing modules 38, i.e., the unit buffer area in which the valid data is not stored emerges in the unit buffer areas constituting the buffer 40A, due to the latest pointer update. When the determination is negative, the data read processing is terminated after performing the above described check processing of the reading queue (the determination of whether or not the read request information is registered in the reading queue). When a unit buffer area in which the valid data is not stored emerges, the buffer control unit 40B causes the resource management unit 46B to release this unit buffer area, and the data read processing is terminated after performing the check processing of the reading queue.

When the amount of the valid data, which is stored in the buffer 40A and can be read by the image processing module 38 of the read request source, is lower than the unit read data amount, and when the end of the readable valid data is not the end of the image data of the processing target (i.e., when the absence of readable valid data is detected in (4) of FIG. 4B), the buffer control unit 40B outputs a data request to the workflow management unit 46A requesting new image data (see (5) of FIG. 4B). Then, the read request information read from the reading queue is registered at the head or the end of the original queue again, and the data read processing is terminated after the reading queue check processing. In this case, the workflow management unit 46A inputs a processing request to the preceding image processing module 38 of the own buffer module 40. Thus, until it is detected that the data amount of the readable valid data becomes equal to or more than the unit read data amount, or it is detected that the end of the readable valid data is the end of the image data of the processing target, the read request information corresponding to the new image data is stored in the reading queue, and the read request information is periodically read to repeatedly try to perform the requested processing.

While the details are described below, when the data request is input by the buffer module 40, the workflow management unit 46A inputs the processing request to the preceding image processing module 38 of the buffer module 40 (see (6) of FIG. 4B). When the preceding image processing module 38 becomes able to write the image data in the buffer module 40 due to the processing performed by the control unit 38B of the preceding image processing module 38 triggered by the input of the processing request, the data write processing is performed due to the input of the write request from the preceding image processing module 38, and the image data is written in the buffer 40A of the buffer module 40 from the preceding image processing module 38 (see (7) and (8) of FIG. 4B). Thereby, the following image processing module 38 may read the image data from the buffer 40A (see (9) of FIG. 4B).

Next, image processing module control processing which is performed by the control unit 38B of each image processing module 38 each time the workflow management unit 46A inputs the processing request to the image processing modules 38 constituting the image processing unit 50, will be described with reference to FIG. 10.

In the image processing module control processing, in Step 260, the control unit 38B recognizes the memory size used in the own image processing modules 38 and the presence or absence of other resources which can be used based on the type and contents of the image processing performed by the own image processing engine 38A. The memory used in the image processing module 38 is mainly used to perform the image processing with the image processing engine 38A. However, when the preceding module is the image data supply unit 22, or when the following module is the image output unit 24, a buffer memory in which the image data can be temporarily stored may be required for transmitting and receiving the image data from the preceding or following module. When the processing parameter includes table information, a memory area for retaining the table information may be required. The control unit 38B requests the resource management unit 46B to reserve a memory area having the recognized size, and obtains the memory area reserved by the resource management unit 46B. When the control unit 38B recognizes that the own image processing module 38 (the image processing engine 38A thereof) requires a resource other than memory, the control unit 38B requests the resource management unit 46B to reserve another resource, and the control unit 38B obtains another resource from the resource management unit 46B.

In next Step 262, the control unit 38B requests data (the image data or result of the image processing such as analysis) from the preceding module, if a preceding module (such as a buffer module 40, the image data supply unit 22, or an image processing module 38) exists. In Step 264, the control unit 38B determines whether or not the data can be obtained from the preceding module. When the determination in Step 264 is negative, the control unit 38B determines, in Step 266, whether or not the control unit 38B is notified of the end of the entire processing. When the determination in Step 266 is negative, the sequence returns to Step 264, and Steps 264 and 266 are repeated until the data can be obtained from the preceding module. When the determination in Step 264 is affirmative, in Step 268, the data obtaining processing is performed, and the obtained data is written in the memory area for temporarily storing, the data in the memory area obtained in Step 260.

Here, if the preceding module of the own image processing module 38 is the buffer module 40, when the control unit 38B requests data in Step 262 (read request), the control unit 38B is notified by the buffer module 40 of the head address of the read area, and requested to read the image data. This notification and request may be issued immediately in a state in which the readable valid data which is not lower than the unit read data amount is stored in the buffer 40A of the buffer module 40, or when the end of the readable valid data matches with the end of the image data of the processing target. Otherwise, this notification and request may be issued after the preceding image processing module 38 of the buffer module 40 writes the image data in the buffer 40A of the own buffer module 40 and thereby the above state occurs. Thereby, the determination in Step 264 becomes affirmative, the sequence proceeds to Step 268, and the control unit 38B performs data acquisition processing by reading the image data having the unit read data amount (or a data amount lower than the unit read data amount) from the read area for which the head address has been notified by the preceding buffer module 40, and writing the data in the temporary-storage memory area (see (3) of FIG. 4A).

If the preceding module of the own image processing module 38 is the image data supply unit 22, the preceding image data supply unit 22 immediately notifies the control unit 38B that the image data can be obtained when the control unit 38B outputs the data request in Step 262. Thereby, the determination in Step 264 becomes affirmative, the sequence proceeds to Step 268, and the control unit 38B performs the data acquisition processing so as to obtain image data having the unit read data amount from the preceding image data supply unit 22, and write the data in the temporary-storage memory area. If the preceding module of the own image processing module 38 is an image processing module 38, when the control unit 38B outputs the data request (processing request) in Step 262, the write request is inputted if the preceding image processing module 38 is in a state capable of performing the image processing, and thereby the control unit 38B is notified that the data (image processing result) can be obtained. Therefore, the determination in Step 264 will be affirmative, the sequence proceeds to Step 268, and the control unit 38B notifies, to the preceding image processing module 38, the address of the temporary-storage memory address in which the data can be written, and requests writing of the data. Thus, the control unit 38B performs the data acquisition processing for writing the data from the preceding image processing module 38 in the temporary-storage memory area.

In next Step 270, the control unit 38B determines whether or not plural modules are connected at the preceding stage of the own image processing module 38. When the determination is negative, the sequence proceeds to Step 274 without performing any processings. When the determination is affirmative, the sequence proceeds to Step 272, and the control unit 38B determines whether or not data are obtained from all of the modules connected at the preceding stage. When the determination is negative in Step 272, the sequence returns to Step 262, and Steps 262 to 272 are repeated until the determination in Step 272 becomes affirmative. When all data which should be obtained are obtained from the preceding modules, the determination in Step 270 becomes negative or the determination in Step 272 becomes affirmative, and thereby the sequence proceeds to Step 274.

In next Step 274, the control unit 38B requests an area to output the data at the following module of the own image processing module 38, and the control unit 38B repeatedly makes a determination until the data output area can be obtained in Step 276 (i.e., until the control unit 38B is notified of the head address of the data output area). If the following module is the buffer module 40, the request of the data output area is made by outputting the write request to the buffer module 40. When the data output area (the write area for which the buffer module 40 notifies the control unit 38B of the head address when the following module is the buffer module 40) is obtained (see (4) of FIG. 4A), in next Step 278, the control unit 38B inputs, to the image processing engine 38A, the data obtained in the data acquisition processing, the data output area (the head address thereof) obtained from the following module, and the memory area (the head address and size thereof) for the image processing by the image processing engine in the memory area obtained in Step 260. The control unit 38B causes the image processing engine 38A to perform a predetermined image processing to the inputted data using the memory area for the image processing (see (5) of FIG. 4A), and to write the processed data in the data output area (see (6) of FIG. 4A). When input of the data having the unit read data amount to the image processing engine 38A is completed and all data output from the image processing engine 38A is written in the data output area, the control unit 38B notifies the following module that the data output is completed.

The processing (unit processing) for the unit processing data amount of the data by the image processing module 38 is completed through Steps 262 to 280. In the processing request inputted from the workflow management unit 46A to the image processing module 38, the workflow management unit 46A may specify a number of times of execution of the unit processing. Therefore, in Step 282, the control unit 38B determines whether or not the number of times of execution of the unit processing has reached the number specified by the processing request. If the specified number of times of execution of the unit processing is one, the determination in Step 282 is affirmative automatically. On the other hand, if the specified number of times of execution of the unit processing is two or more, the sequence returns to Step 262, and Steps 262 to 282 are repeated until the determination in Step 282 becomes affirmative. When the determination in Step 282 becomes affirmative, the sequence proceeds to Step 284, and the control unit 38B notifies the workflow management unit 46A that the processing corresponding to the inputted processing request is completed by outputting a notification of processing completion, and thereby the image processing module control processing is terminated and the memory is released (step 286).

When the image data of the processing target is processed to the end by repeating the above processing for each input of the processing request from the workflow management unit 46A, the preceding module notifies the control unit 38B of the end of the image data of the processing target. Therefore, the determination in Step 266 is affirmative, the sequence proceeds to Step 288, and the control unit 38B provides notification of completion of the entire processing to the workflow management unit 46A and the following module that means the processing is completed for the image data of the processing target (which is generally image data of one page, but may be data of plural pages). In next Step 290, the control unit 38B requests release of all the obtained resources, and erases the own image processing module 38. Then, the image processing module control processing is terminated.

On the other hand, when the image processing units 50 are operated in the parallel processing method, the workflow management unit 46A performs the following processing. When performance of the image processing is instructed, the workflow management unit 46A determines the number of times of execution of the unit processing specified by one processing request for each image processing module 38. The number of times of execution of the unit processing per one processing request can be determined, for example, such that the number of inputs of the processing request to each image processing module 38 is averaged while the entire image data of the processing target is processed. However, the process is not limited to this and the number of times of execution of the unit processing per one processing request may be determined based on a different standard. The workflow management unit 46A inputs the processing request to the final image processing module 38 of the image processing unit 50 (see (1) of FIG. 11), and the workflow management unit 46A provisionally terminates the processing.

In the image processing unit 50 shown in FIG. 11, when the workflow management unit 46A inputs the processing request to the final image processing module $38_4$, the control unit 38B of the image processing module $38_4$ inputs the read request to the preceding buffer module $40_3$ (see (2) of FIG. 11). At this time, because the valid data (image data) which can be read by the image processing module $38_4$ is not stored in the buffer 40A of the buffer module $40_3$, the buffer control unit 40B of the buffer module $40_3$ inputs data request to the workflow management unit 46A (see (3) of FIG. 11).

The workflow management unit 46A recognizes the preceding image processing module 38 (in this case, image processing module $38_3$) of the buffer module 40 (in this case, buffer module $40_3$) which is the input source of the data request each time the data request is inputted from the buffer module 40, and the workflow management unit 46A inputs the processing request to the recognized preceding image processing module 38 (see (4) of FIG. 11).

When the processing request is inputted, the control unit 38B of the image processing module $38_3$ inputs the read request to the preceding buffer module $40_2$ (see (5) of FIG. 11). Because the readable image data is also not stored in the buffer 40A of the buffer module $40_2$, the buffer control unit 40B of the buffer module $40_2$ inputs data request to the workflow management unit 46A (see (6) of FIG. 11). The workflow management unit 46A also inputs the processing request to the preceding image processing module $38_2$ when the data request is input by the buffer module $40_2$ (see (7) of FIG. 11). The control unit 38B of the image processing module $38_2$ inputs the read request to the preceding buffer module $40_1$ (see (8) of FIG. 11). Because the readable image data is also not stored in the buffer 40A of the buffer module $40_1$, the buffer control unit 40B of the buffer module $40_1$ also inputs the data request to the workflow management unit 46A (see (9) of FIG. 11). The workflow management unit 46A also inputs the processing request to the preceding image processing module $38_1$ when the data request is input by the buffer module $40_1$ (see (10) of FIG. 11).

Here, because the preceding module of the image processing module $38_1$ is the image data supply unit 22, the control unit 38B of the image processing module $38_1$ inputs the data request to the image data supply unit 22 to obtain the image data having the unit read data amount from the image data supply unit 22 (see (11) of FIG. 11). The image processing engine. 38A performs the image processing to the obtained image data, and the control unit 38B writes the processed image data in the buffer 40A of the following buffer module $40_1$ (see (12) of FIG. 11).

The buffer control unit 40B of the buffer module $40_1$ requests reading of the valid data at the image processing module $38_2$ when valid data having at least the unit read data amount which can be read by the following image processing module $38_2$ is written in the buffer module $40_1$. The control unit 38B of the image processing module $38_2$ reads the unit read data amount of the image data from the buffer 40A of the buffer module $40_1$ (see (13) of FIG. 11), and writes the image data obtained due to the image processing performed by the image processing engine 38A in the buffer 40A of the following buffer module $40_2$ (see (14) of FIG. 11). The buffer control unit 40B of the buffer module $40_2$ requests reading of the valid data at the following image processing module $38_3$ when valid data having at least the unit read data amount which can be read by the image processing module $38_3$ is written in the buffer module $40_2$. The control unit 38B of the image processing module $38_3$ reads the unit read data amount of the image data from the buffer 40A of the buffer module $40_2$ (see (15) of FIG. 11), and writes the image data obtained due to the image processing performed by the image processing engine 38A in the buffer 40A of the following buffer module $40_3$ (see (16) of FIG. 11).

The buffer control unit 40B of the buffer module $40_3$ requests reading of the valid data at the image processing module $38_4$ when valid data having at least the unit read data amount which can be read by the following image processing module $38_4$ is written in the buffer module $40_3$. The control unit 38B of the image processing module $38_4$ reads the unit read data amount of the image data from the buffer 40A of the buffer module $40_3$ (see (17) FIG. 11), and writes the image data obtained due to the image processing performed by the image processing engine 38A to the image output unit 24 which is the following module (see (18) of FIG. 11).

The control unit 38B of each image processing module 38 inputs the processing completion notification to the workflow management unit 46A when the writing of the image data in the buffer 40A of the following buffer module 40 is completed. The workflow management unit 46A inputs the processing request to the image processing module 38 which is the source of the processing completion notification again each time the processing completion notification is inputted from the image processing module 38.

Thus, when the image processing units 50 are operated by the parallel processing method, the workflow management unit 46A inputs the processing request to the image processing module 38 which is the source of the processing completion notification again each time the processing completion notification is inputted from any image processing module 38. Accordingly, in this method, the image data of the processing target is sequentially transferred from the preceding module to the following module in a unit (block) of image data having a smaller size than image data of one page and the image processing is performed to the image data of the processing target by the parallel processing method in which the image processing modules 38 perform the image processing in parallel with each other. When the image data supplied from the image data supply unit 22 reaches the end of the image data of the processing target, the image processing modules 38 sequentially input the entire processing completion notification to the workflow management unit 46A from the preceding image processing module 38 to the following image processing module 38.

The workflow management unit 46A determines whether or not the image processing module 38 which is the input source of the entire processing completion notification is the final image processing module 38 each time the entire processing completion notification is inputted from an image processing module 38. When the determination is negative, the processing is terminated without performing any processing. However, when the entire processing completion notification is inputted from the final image processing module 38 due to outputting of image data resulting from the performance of the necessary image processing to all of the image data of the processing target to the image output unit 24, the workflow management unit 46A notifies the application body 32A of the completion of the image processing (see Step 178 of FIG. 5), and the processing is terminated. The application body 32A notified of the completion of the image processing notifies the user of the completion of the image processing (see Step 180 of FIG. 5).

When the image processing units 50 are operated by the serial processing method, the workflow management unit 46A performs the same processing as the parallel processing method when the performance of the image processing is instructed, when the data request is input from the buffer module 40, and when the entire processing completion notification is input from the image processing module 38. The workflow management unit 46A determines whether or not the image processing module 38 that is the source of the processing completion notification is the final image processing module 38 when the processing module 38 inputs the processing completion notification. When the determination is negative, the processing is terminated without performing any processing. When the determination is affirmative, the workflow management unit 46A inputs the processing request to the image processing module 38 which is the source of the processing completion notification again, and the processing is terminated.

Accordingly, the processing request inputted to the final image processing module 38 of the image processing unit 50 goes forward to the further preceding image processing module 38. When the processing request reaches the first image module 38, the image processing is performed to the image data (block) having a smaller size than image data of one page serially from the first image processing module 38 (only one of the image processing modules 38 performs the image processing at any one time and the image processing modules 38 which perform the image processing are sequentially switched). When the image processing by the final image processing module 38 with respect to the above data is completed, the processing request is repeatedly input again to the final image processing module 38. In this way, image processing of the image data of the processing target is performed in the serial processing method.

In the above external module provision processing (see FIG. 6) and image processing module generation processing (see FIG. 7), the processing module generation function 34A performs the processing of generation of the image processing module 38 by the processing generation module 34B and the processing of notifying the processing management unit 46 of the ID of the generated image processing module 38. However, embodiment of the present invention is not limited to these exemplary embodiments. For example, the external module provision unit 45 may perform the external module provision processing shown in FIG. 12 while the processing module generation function 34A performs the image processing module generation processing shown in FIG. 13.

Figure 12:
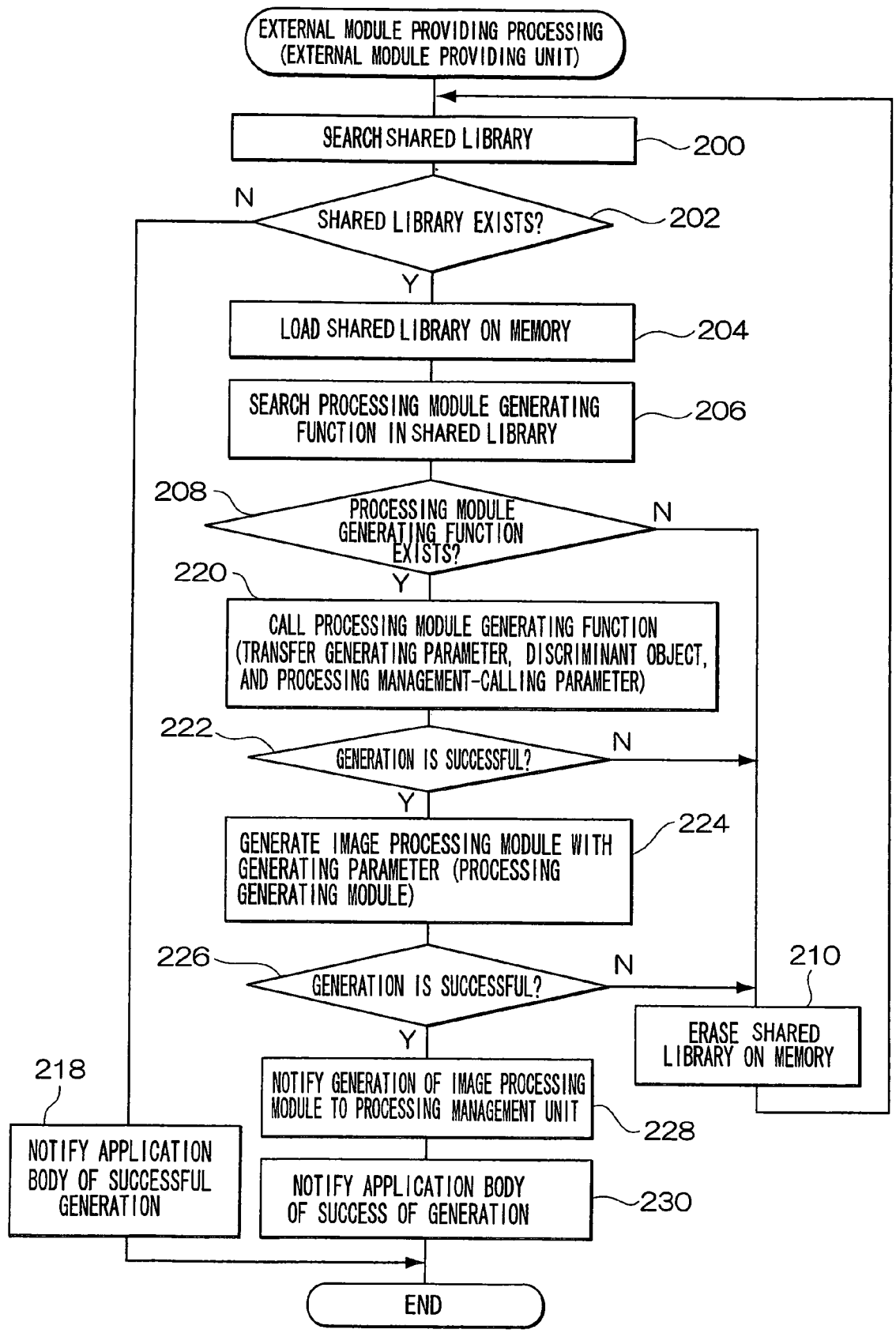
FIG. 12 is a flowchart showing another example of the contents of the external module provision processing.

In the external module provision processing shown in FIG. 12, after the shared library is found (when determination in Step 202 is affirmative) by a search of the shared library (Step 200), and the found shared library is dynamically loaded at the memory 14 (Step 204), the processing module generation function 34A registered in the dynamically-loaded shared library is searched (Step 206). When the processing module generation function 34A is found (when determination in Step 208 is affirmative), the found processing module generation function 34A is called in Step 220, and only a predetermined discriminant object is provided as the argument to the processing module generation function 34A.

Figure 13:
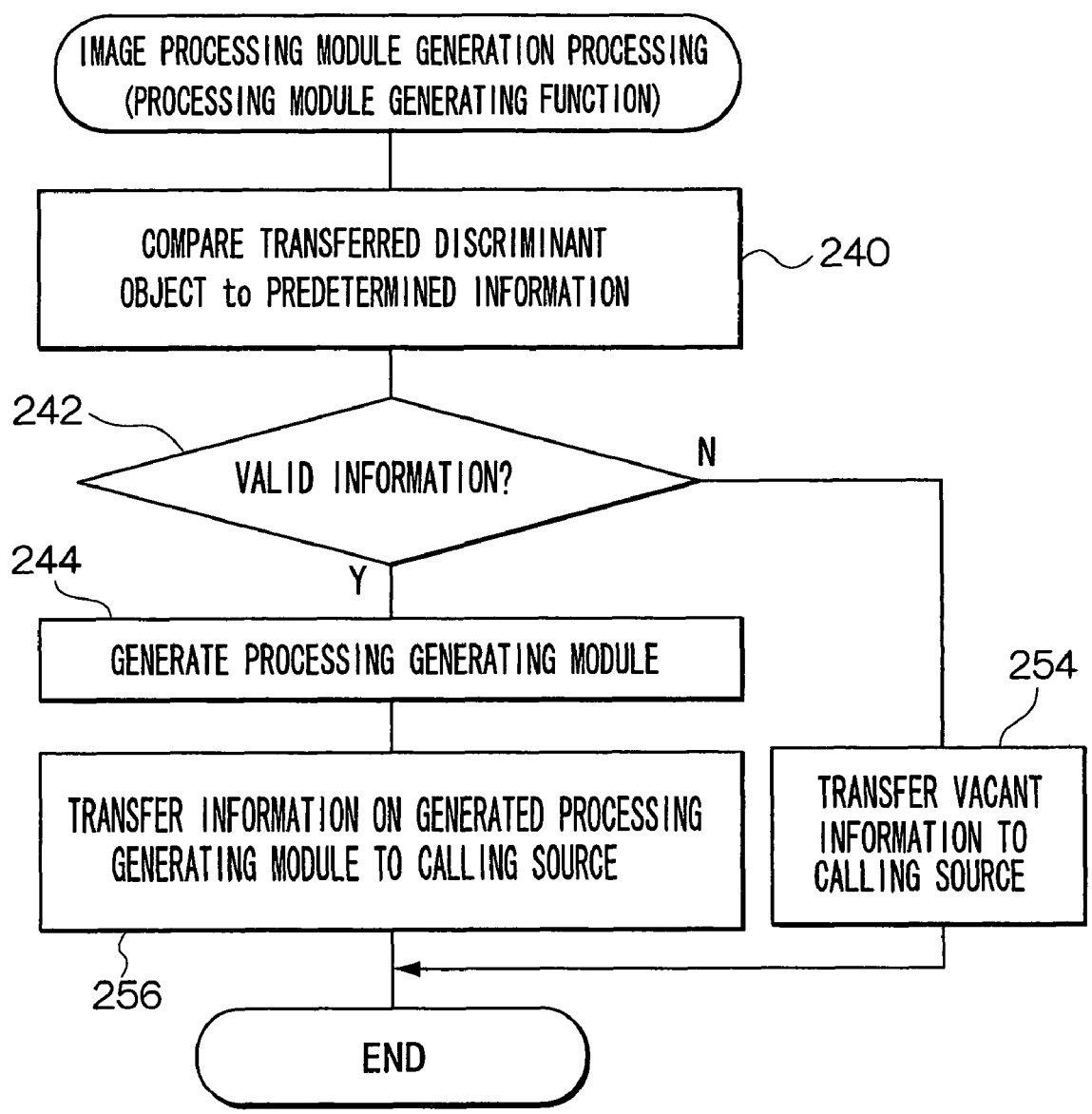
FIG. 13 is a flowchart showing another example of the contents of the image processing module generation processing.

Thereby, the processing module generation function 34A performs the image processing module generation processing shown in FIG. 13. In the image processing module generation processing, validation of the discriminant object which is provided as the argument from the external module provision unit 45 is performed (Step 240). When it is determined that the calling source of the processing module generation function 34A is the external module provision unit 45, based on result of the validation of the discriminant object (when determination in Step 242 is affirmative), in Step 244, the processing generation module 34B is activated by generating the program of the processing generation module 34B registered in the same shared library 34 as a thread (at this time, the module generation processing parameter is not provided as the argument). The processing module generation function 34A notifies the calling source (i.e., the external module provision unit 45) of the information for identifying the processing generation module 34B generated as the thread (step 256), and the processing is terminated.

In the external module provision processing shown in FIG. 12, when a response is returned when the image processing module generation processing performed by the processing module generation function 34A is completed, in next Step 222, the external module provision unit 45 determines whether or not the processing generation module 34B is successfully generated based on the response from the processing module generation function 34A. When the determination is negative, the sequence proceeds to Step 210, the shared library 34 dynamically loaded at the memory 14 is erased from the memory 14, and then the sequence returns to Step 200. When the determination is affirmative, the sequence proceeds to Step 224, and the external module provision unit 45 recognizes the generated processing generation module 34B based on the information notified by the processing module generation function 34A to the external module provision unit 45. The external module provision unit 45 provides the module generation processing parameter to the recognized processing generation module 34B, and instructs the processing generation module 34B to generate the image processing module 38.

Therefore, in Step 224, the processing generation module 34B performs the processing in which the image processing program 34C registered in the same shared library 34 is generated to be the image processing module 38. In this exemplary embodiment, the control unit 38B of the generated image processing module 38 determines whether or not the contents of the image processing performed by the image processing engine 38A (i.e., the image processing program 34C) of the own image processing module 38 conform to the provided module generation processing parameter. The external module provision unit 45 is notified of the determination result, such as successful or failed generation of the image processing module 38, of the control unit 38B through the processing generation module 34B. In next Step 226, based on the notification from the processing generation module 34B, the external module provision unit 45 determines whether or not the image processing module 38 is successfully generated.

When the processing generation module 34B notifies the external module provision unit 45 of failed generation of the image processing module 38 (when determination in Step 226 is negative), the sequence proceeds to Step 210, the shared library 34 dynamically loaded at the memory 14 is erased from the memory 14, and then, the sequence returns to Step 200. When the processing generation module 34B notifies the external module provision unit 45 of successful generation of the image processing module 38 (when the determination in Step 226 is affirmative), the sequence proceeds to Step 228, and the external module provision unit 45 notifies the processing management unit 46 of the ID of the generated image processing module 38. In Step 230, the external module provision unit 45 notifies the application body 32A that the image processing module 38 is successfully generated. Then, the processing is terminated.

Thus, the external module provision unit 45 may perform the processing of generation of the image processing module 38 by the processing generation module 34B and the processing of notifying the processing management unit 46 of the ID of the generated image processing module 38. In the above exemplary embodiment, the processing module generation function 34A corresponds to a second module generation unit, the processing generation module 34B corresponds to a first module generation unit, and the external module provision unit 45 corresponds to a construction unit of the exemplary embodiment.

Further, in the above exemplary embodiment, the module generation unit is separated into the processing module generation function 34A (the second module generation unit) and the processing generation module 34B (the first module generation unit). However, the invention is not limited to this. For example, a single program having both functions corresponding to the processing module generation function 34A and the processing generation module 34B may be registered as the module generation unit in the shared library 34.

Furthermore, in the exemplary embodiment, the program of the image processing application 32 corresponding to the image processing program of the present invention is stored (installed) in advance in the storage unit 20. Alternatively, the image processing program can be provided in a form in which the image processing program is recorded in a recording medium such as a CD-ROM or DVD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a first storage unit that stores a program of at least one module including a buffer module from among modules, connected in a pipeline form or a directed acyclic graph form, of an image processing unit that is constructed such that a buffer module is connected at preceding and/or following stages of at least one image processing module, the image processing module performing predetermined image processing to image data obtained from a preceding module of the image processing module, and outputting processed image data or a processing result to a following module of the image processing module, and the buffer module allowing writing to a buffer of the image data which is output from a preceding module of the buffer module and allowing reading of the image data stored in the buffer by a following module of the buffer module;
a second storage unit configured to additionally store an image processing program and a shared library, the image processing program performing an image processing and a program of a module generation unit being registered in the shared library, the module generation unit generating the image processing program as the image processing module based on a module generation parameter provided thereto;
a control unit that, each time the control unit is notified of generation of a given module constituting the image processing unit during construction of the image processing unit, retains information on the generated module as notified, as construction information, instructs at least one image processing module constituting the constructed image processing unit to perform the image processing based on the construction information, and thereby causes the image processing unit to perform the image processing; and
a construction unit that constructs the image processing unit to be constructed by:
    (a) generating an image processing module that, among the modules constituting the constructed image processing unit and linked in advance to the program of the at least one module stored in the first storage unit, has the program stored in the first storage unit, by reading the program from the first storage unit and loading the program at a computer memory,
    (b) notifying the control unit of the generation of the module,
    (c) generating a module whose program is not stored in the first storage unit, by searching the shared library stored in the second storage unit, dynamically loading the program at the computer memory, and providing the module generation parameter to the module generation unit to generate the image processing module, and
    (d) notifying the control unit of the generation of the image processing module or causing the module generation unit to notify the control unit of the generation of the image processing module, wherein
the program of the at least one module stored in the first storage unit, a program of the control unit, and a program of the construction unit are stored in the first storage unit and compiled as a single processing program of an execute format, and
the control unit and the construction unit are implemented by causing a program execution resource of the computer to execute the corresponding programs.

2. The image processing apparatus of claim 1, wherein the module generation unit comprises:
a first module generation unit that generates the image processing program as the image processing module based on the provided module generation parameter; and
a second module generation unit that when the second module generation unit is called, a generation-notification destination is assigned and the module generation parameter is provided, activates the first module generation unit, and transfers the module generation parameter to the activated first module generation unit to generate the image processing module, notifies the assigned generation-notification destination of the generation of the image processing module when the image processing module is normally generated and returns control to a calling source, and the construction unit searches the shared library to dynamically load the shared library at a memory of the computer, provides the module generation parameter to the second module generation unit in the loaded shared library, and specifies the control unit as the generation-notification destination, causing the second module generation unit to generate the image processing module and to notify the control unit of the generation of the image processing module.

3. The image processing apparatus of claim 2, wherein the construction unit provides a predetermined discriminant object to the second module generation unit when calling the second module generation unit, and the second module generation unit compares the discriminant object provided from the calling source with information retained in advance to determine whether or not the calling source is valid, and continues processing when it is determined that the calling source is valid.

4. The image processing apparatus of claim 1, wherein the module generation unit comprises:

a first module generation unit that generates the image processing program as the image processing module based on the provided module generation parameter; and a second module generation unit that activates the first module generation unit and returns control to a calling source when called, and the construction unit searches the shared library to dynamically load the shared library at a memory of the computer, calls the second module generation unit in the loaded shared library to activate the first module generation unit, and provides the module generation parameter to the activated first module generation unit to generate the image processing module, and notifies the control unit of the generation of the image processing module when the image processing module is normally generated.

5. The image processing apparatus of claim 4, wherein the construction unit provides a predetermined discriminant object to the second module generation unit when calling the second module generation unit, and the second module generation unit compares the discriminant object provided from the calling source with information retained in advance to determine whether or not the calling source is valid, and continues processing when it is determined that the calling source is valid.

6. The image processing apparatus of claim 1, wherein the module generation unit attempts to generate the image processing program as the image processing module based on the provided module generation parameter, returns a normal response when the image processing module is normally generated, and returns an error response when the image processing implemented by the image processing program does not match the module generation parameter, and the construction unit searches another shared library stored in the second storage unit when the error response is returned from the module generation unit.

7. A non-transitory computer-readable storage medium storing an image processing program for a computer comprising:

a first storage unit that stores a program of at least one module including a buffer module from among modules, connected in a pipeline form or a directed acyclic graph form, of an image processing unit that is constructed such that a buffer module is connected at preceding and/or following stages of at least one image processing module, the image processing module performing predetermined image processing to image data obtained from a preceding module of the image processing module, and outputting processed image data or a processing result to a following module of the image processing module, and the buffer module allowing writing to a buffer of the image data which is output from a preceding module of the buffer module and allowing reading of the image data stored in the buffer by a following module of the buffer module, and a second storage unit configured to store an image processing program and a shared library, the image processing program performing an image processing and a program of a module generation unit being registered in the shared library, the module generation unit generating the image processing program as the image processing module based on a module generation parameter provided thereto, the program causing the computer to function as:

a control unit that, each time the control unit is notified of generation of a given module constituting the image processing unit during construction of the image processing unit, retains information on the generated module as notified, as construction information, instructs at least one image processing module constituting the constructed image processing unit to perform the image processing based on the construction information, and thereby causes the image processing unit to perform the image processing; and a construction unit that constructs the image processing unit to be constructed by:

(a) generating an image processing module that, among the modules constituting the constructed image processing unit and linked in advance to the program of the at least one module stored in the first storage unit, has the program stored in the first storage unit, by reading the program from the first storage unit and loading the program at a computer memory, (b) notifying the control unit of the generation of the module, (c) generating a module whose program is not stored in the first storage unit, by searching the shared library stored in the second storage unit, dynamically loading the program at the computer memory, and providing the module generation parameter to the module generation unit to generate the image processing module, and (d) notifying the control unit of the generation of the image processing module or causing the module generation unit to notify the control unit of the generation of the image processing module, wherein the program of the at least one module stored in the first storage unit, a program of the control unit, and a program of the construction unit are stored in the first storage unit and compiled as a single processing program of an execute format, and the control unit and the construction unit are implemented by causing a program execution resource of the computer to execute the corresponding programs.

8. The non-transitory computer-readable storage medium of claim 7, wherein the module generation unit comprises:

a first module generation unit that generates the image processing program as the image processing module based on the provided module generation parameter; and a second module generation unit that when the second module generation unit is called, a generation-notification destination is assigned and the module generation parameter is provided, activates the first module generation unit, and transfers the module generation parameter to the activated first module generation unit to generate the image processing module, notifies the assigned generation-notification destination of the generation of the image processing module when the image processing module is normally generated and returns control to a calling source, and the construction unit searches the shared library to dynamically load the shared library at a memory of the computer, provides the module generation parameter to the second module generation unit in the loaded shared library, and specifies the control unit as the generation-notification destination to cause the second module generation unit to generate the image processing module and to notify the control unit of the generation of the image processing module.

9. The non-transitory computer-readable storage medium of 8, wherein the construction unit provides a predetermined discriminant object to the second module generation unit when calling the second module generation unit, and the second module generation unit compares the discriminant object provided from the calling source with information retained in advance to determine whether or not the calling source is valid, and continues processing when it is determined that the calling source is valid.

10. The non-transitory computer-readable storage medium of claim 7, wherein the module generation unit comprises:

a first module generation unit that generates the image processing program as the image processing module based on the provided module generation parameter; and a second module generation unit that activates the first module generation unit and returns control to a calling source when called, and the construction unit searches the shared library to dynamically load the shared library at a memory of the computer, calls the second module generation unit in the loaded shared library to activate the first module generation unit, and provides the module generation parameter to the activated first module generation unit to generate the image processing module, and notifies the control unit of the generation of the image processing module when the image processing module is normally generated.

11. The non-transitory computer-readable storage medium of claim 10, wherein the construction unit provides a predetermined discriminant object to the second module generation unit when calling the second module generation unit, and the second module generation unit compares the discriminant object provided from the calling source with information retained in advance to determine whether or not the calling source is valid, and continues processing when it is determined that the calling source is valid.

12. The non-transitory computer-readable storage medium of claim 7, wherein the module generation unit attempts to generate the image processing program as the image processing module based on the provided module generation parameter, returns a normal response when the image processing module is normally generated, and returns an error response when the image processing implemented by the image processing program does not match the module generation parameter, and the construction unit searches another shared library stored in the second storage unit when the error response is returned from the module generation unit.

13. An image processing method comprising:

storing in a first storage unit a program of at least one module including a buffer module from among modules, connected in a pipeline form or a directed acyclic graph form, of an image processing unit that is constructed such that a buffer module is connected at the preceding and/or following stages of at least one image processing module, the image processing module performing predetermined image processing to image data obtained from a preceding module of the image processing module, and outputting processed image data or a processing result to a following module of the image processing module, and the buffer module allowing writing to a buffer of the image data which is output from a preceding module of the buffer module and allowing reading of the image data stored in the buffer by a following module of the buffer module;

further storing in a second storage unit an image processing program and a shared library, the image processing program performing an image processing and a program of a module generation unit being registered in the shared library, the module generation unit generating the image processing program as the image processing module based on a module generation parameter provided thereto;

retaining information on a generated module as notified, as construction information, instructing at least one image processing module constituting the constructed image processing unit to perform the image processing based on the construction information, and thereby causing the image processing unit to perform the image processing, each time a notification of generation of a given image processing module constituting the image processing unit is made during construction of the image processing unit; and constructing the image processing unit to be constructed by:

(a) generating an image processing module that, among the modules constituting the constructed image processing unit and linked in advance to the program of the at least one module stored in the first storage unit, has its program stored in the first storage unit, by reading the program from the first storage unit and loading the program to a computer memory, (b) making notification regarding the generation of the module, (c) generating an image processing module whose program is not stored in the first storage unit by searching the shared library stored in the second storage unit, dynamically loading the program at the computer memory, and providing the module generation parameter to the module generation unit to generate the image processing module, and (d) making notification regarding the generation of the image processing module or causing the module generation unit to make notification regarding the generation of the image processing module, and storing in the first storage unit and compiling as a single processing program of an executed format the program of at least one module stored in the first storage unit, a program of the retaining information on the generated module, and a program of constructing the image processing unit, and causing a program execution resource of the computer to execute the corresponding programs.

* * * * *